(12) United States Patent
Mizunuma et al.

(10) Patent No.: US 11,209,908 B2
(45) Date of Patent: Dec. 28, 2021

(54) INFORMATION PROCESSING APPARATUS AND INFORMATION PROCESSING METHOD

(71) Applicant: SONY CORPORATION, Tokyo (JP)

(72) Inventors: Hiroyuki Mizunuma, Tokyo (JP); Ikuo Yamano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/468,466

(22) PCT Filed: Oct. 24, 2017

(86) PCT No.: PCT/JP2017/038271
§ 371 (c)(1),
(2) Date: Jun. 11, 2019

(87) PCT Pub. No.: WO2018/131251
PCT Pub. Date: Jul. 19, 2018

(65) Prior Publication Data
US 2020/0073481 A1 Mar. 5, 2020

(30) Foreign Application Priority Data
Jan. 12, 2017 (JP) ................. 2017-003421

(51) Int. Cl.
*G06F 3/01* (2006.01)
*G06K 9/00* (2006.01)

(52) U.S. Cl.
CPC ......... *G06F 3/017* (2013.01); *G06K 9/00335* (2013.01)

(58) Field of Classification Search
CPC ...... G06F 3/014; G06F 3/017; G06K 9/00335
See application file for complete search history.

(56) References Cited

U.S. PATENT DOCUMENTS

| | | | |
|---|---|---|---|
| 8,947,323 B1* | 2/2015 | Raffle | G09G 3/001 345/8 |
| 2005/0212767 A1* | 9/2005 | Marvit | G06F 1/1694 345/158 |
| 2009/0325710 A1* | 12/2009 | Filer | G06F 3/03 463/42 |

(Continued)

FOREIGN PATENT DOCUMENTS

| | | |
|---|---|---|
| CA | 2724855 A1 | 12/2009 |
| CA | 2892290 A1 | 7/2014 |

(Continued)

OTHER PUBLICATIONS

International Search Report and Written Opinion of PCT Application No. PCT/JP2017/038271, dated Jan. 23, 2018, 16 pages of ISRWO.

*Primary Examiner* — Hong Zhou
(74) *Attorney, Agent, or Firm* — Chip Law Group

(57) ABSTRACT

Provided are an information processing apparatus, an information processing method, and a program capable of further improving gesture recognition accuracy. There is provided an information processing apparatus including a context recognition unit that recognizes a context related to a user, a gesture recognition unit that recognizes a gesture of a user, and a setting change unit that dynamically changes a recognition setting of the gesture recognition unit based on recognition result of the context recognition unit.

22 Claims, 17 Drawing Sheets

SWING ARM
WITH ARM DOWN

SWING ARM
WITH ARM UP

| STATE OF ARM ON WHICH DEVICE IS WORN | THRESHOLD OF RECOGNITION ALGORITHM |
|---|---|
| ARM DOWN STATE | 3 |
| ARM UP STATE | 6 |

(56) References Cited

U.S. PATENT DOCUMENTS

| | | | |
|---|---|---|---|
| 2010/0315253 A1* | 12/2010 | Hong | G06F 3/017 340/686.1 |
| 2011/0018731 A1 | 1/2011 | Linsky et al. | |
| 2013/0229346 A1 | 9/2013 | Jungbauer et al. | |
| 2013/0268900 A1 | 10/2013 | Ferren et al. | |
| 2014/0181741 A1 | 6/2014 | Apacible et al. | |
| 2014/0191974 A1* | 7/2014 | Sako | G06F 3/017 345/168 |
| 2014/0375551 A1 | 12/2014 | Oshita | |
| 2014/0375552 A1* | 12/2014 | Kasuga | G06F 3/03 345/156 |
| 2015/0022439 A1* | 1/2015 | Alameh | G06F 3/017 345/156 |
| 2015/0078613 A1* | 3/2015 | Forutanpour | G06K 9/6267 382/103 |
| 2016/0018872 A1* | 1/2016 | Tu | G06F 1/3234 345/173 |
| 2016/0091965 A1 | 3/2016 | Wang et al. | |
| 2016/0132102 A1 | 5/2016 | Nakagawa et al. | |
| 2016/0132126 A1 | 5/2016 | Van Laack et al. | |
| 2016/0202665 A1* | 7/2016 | Park | G04C 3/002 368/225 |
| 2016/0299570 A1* | 10/2016 | Davydov | G06F 3/167 |
| 2017/0332236 A1* | 11/2017 | Li | H04L 63/083 |
| 2019/0204932 A1* | 7/2019 | Zhang | G06F 3/017 |

FOREIGN PATENT DOCUMENTS

| | | |
|---|---|---|
| CN | 102077234 A | 5/2011 |
| CN | 102473024 A | 5/2012 |
| CN | 103472911 A | 12/2013 |
| CN | 103927000 A | 7/2014 |
| CN | 104243688 A | 12/2014 |
| CN | 105051674 A | 11/2015 |
| CN | 105264467 A | 1/2016 |
| CN | 105518608 A | 4/2016 |
| CN | 105584368 A | 5/2016 |
| CN | 106922185 A | 7/2017 |
| CN | 107066100 A | 8/2017 |
| DE | 102012203457 A1 | 9/2013 |
| DE | 102014116292 A1 | 5/2016 |
| EP | 2291819 A2 | 3/2011 |
| EP | 2457136 A1 | 5/2012 |
| EP | 2636954 A2 | 9/2013 |
| EP | 2816449 A2 | 12/2014 |
| EP | 2936299 A2 | 10/2015 |
| EP | 3007042 A1 | 4/2016 |
| EP | 3044662 A1 | 7/2016 |
| EP | 3201729 A1 | 8/2017 |
| JP | 2011-526192 A | 10/2011 |
| JP | 2013-500521 A | 1/2013 |
| JP | 2013-229009 A | 11/2013 |
| JP | 2014-137627 A | 7/2014 |
| JP | 2014-238696 A | 12/2014 |
| JP | 2015-004567 A | 1/2015 |
| JP | 2016-511859 A | 4/2016 |
| JP | 2016-088513 A | 5/2016 |
| JP | 2016-530660 A | 9/2016 |
| KR | 10-2011-0031925 A | 3/2011 |
| KR | 10-2012-0047970 A | 5/2012 |
| KR | 10-2017-0066539 A | 6/2017 |
| MX | 2010013570 A | 2/2011 |
| MX | 2015008294 A | 12/2015 |
| RU | 2010153354 A | 7/2012 |
| RU | 2015124586 A | 1/2017 |
| TW | 201002400 A | 1/2010 |
| WO | 2009/158628 A2 | 12/2009 |
| WO | 2011/011746 A1 | 1/2011 |
| WO | 2012/087309 A1 | 6/2012 |
| WO | 2014/105900 A2 | 7/2014 |
| WO | 2014/196156 A1 | 12/2014 |
| WO | 2015/038866 A1 | 3/2015 |
| WO | 2016/053822 A1 | 4/2016 |

* cited by examiner

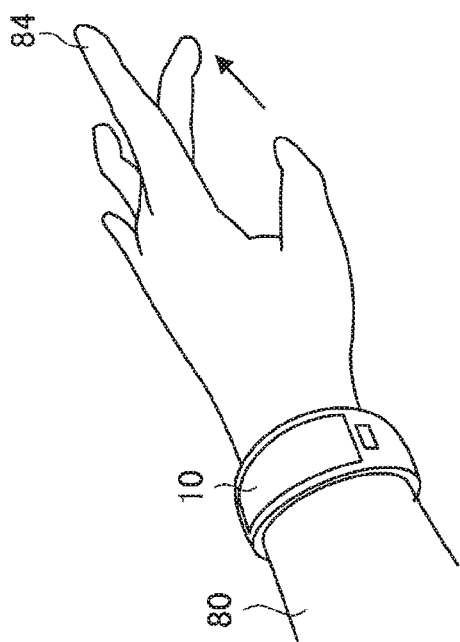
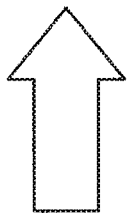
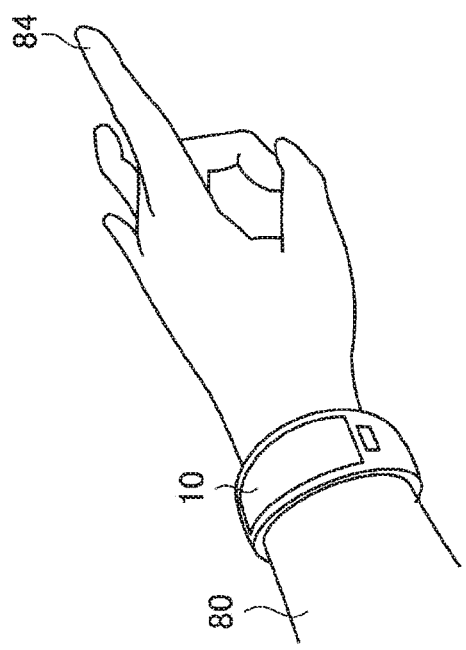
FIG. 7

FIG. 11

| ACTION OF USER | THRESHOLD OF SENSOR |
|---|---|
| SLEEPING | 9 |
| SITTING | 1 |
| STANDING | 1 |
| WALKING | 3 |
| RUNNING | 5 |
| ON TRAIN | 8 |

FIG. 12

| ACTION OF USER | TYPE OF SENSOR |
|---|---|
| STATIONARY | ACCELERATION SENSOR |
| WALKING/RUNNING | ACCELERATION SENSOR + GYRO SENSOR |
| RIDING ON AUTOMOBILE | ACCELERATION SENSOR + GYRO SENSOR |
| ON AIRPLANE | ACCELERATION SENSOR |

FIG. 13

| ACTION OF USER | GESTURE |
|---|---|
| STATIONARY | SWING UP ARM + SWING ARM + ROTATE ARM |
| WALKING | SWING UP ARM |
| ON TRAIN | SWING UP ARM + SWING ARM + ROTATE ARM |

FIG. 14

| ACTION OF USER | RECOGNITION ENGINE |
|---|---|
| STATIONARY | RECOGNITION ENGINE FOR USER STATIONARY MODE |
| ON TRAIN | RECOGNITION ENGINE FOR TRAIN MODE |
| WALKING | RECOGNITION ENGINE FOR USER WALKING MODE |
| RIDING ON AUTOMOBILE | RECOGNITION ENGINE FOR AUTOMOBILE MODE |

FIG. 15
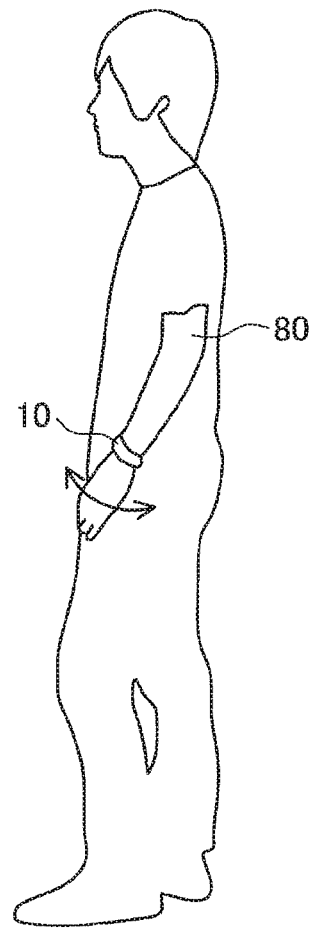
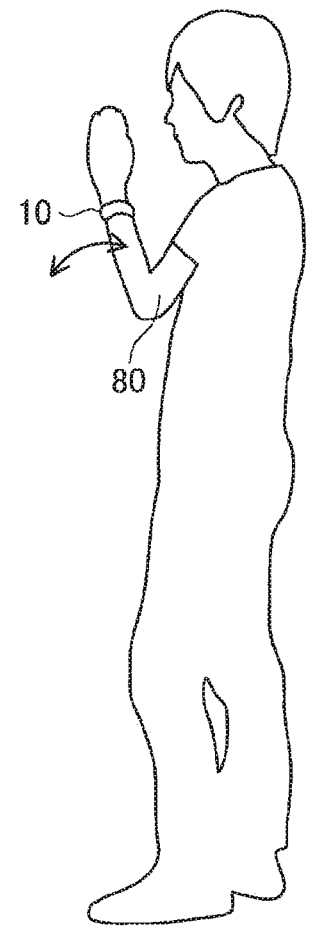
SWING ARM
WITH ARM DOWN
SWING ARM
WITH ARM UP
FIG. 16
| STATE OF ARM ON WHICH DEVICE IS WORN | THRESHOLD OF RECOGNITION ALGORITHM |
|---|---|
| ARM DOWN STATE | 3 |
| ARM UP STATE | 6 |

FIG. 17

| PULSE RATE OF USER | ACTION OF USER | | |
|---|---|---|---|
| | WALKING | RUNNING | ON TRAIN |
| 81~ | 3 | 4 | 3 |
| ~80 | 1 | 4 | 2 |

FIG. 18

| AGE OF USER | ACTION OF USER | | |
| --- | --- | --- | --- |
| | WALKING | RUNNING | ON TRAIN |
| ~30 | 3 | 4 | 3 |
| 31~60 | 2 | 3 | 2 |
| 61~ | 1 | 10 | 1 |

FIG. 19

| APPLICATION USED | ACTION OF USER | | |
|---|---|---|---|
| | WALKING | RUNNING | ON TRAIN |
| NAVIGATION | 2 | 1 | 3 |
| CALL | 1 | 1 | 2 |
| GAME | 1 | 0 | 4 |

| CONNECTION DEVICE | GESTURE A | GESTURE B |
|---|---|---|
| HEAD SET | NEXT MUSIC | PREVIOUS MUSIC |
| SMARTPHONE | SCROLL | CANCEL |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/038271 filed on Oct. 24, 2017, which claims priority benefit of Japanese Patent Application No. JP 2017-003421 filed in the Japan Patent Office on Jan. 12, 2017. Each of the above-referenced applications is hereby incorporated herein by reference in its entirety.

TECHNICAL FIELD

The present disclosure relates to an information processing apparatus, an information processing method, and a program.

BACKGROUND ART

In recent years, mobile terminals (hereinafter, referred to as "wristband type terminals") that are worn on arms like wristwatches are spreading. Operation input to such a wristband type terminal is generally performed mainly on a touch panel provided on a terminal. However, some of the wristband type terminals can recognize gestures such as "grip" and "release" when the wristband type terminals are worn on the wrist and accept recognition results as input commands, as shown in Patent Document 1 below, for example.

Recognition of the gesture as described above is performed by detecting movement of the wristband type terminal using a motion sensor such as an acceleration sensor or a gyro sensor and using a recognition algorithm of the gesture from a detection value to recognize what gesture the user is performing. Recently, it is possible to develop advanced recognition algorithms using machine learning or the like, and recognition accuracy is improved so that gestures are recognized accurately by using such recognition algorithms.

CITATION LIST

Patent Document

Patent Document 1: Japanese Patent Application Laid-Open No.

SUMMARY OF THE INVENTION

Problems to be Solved by the Invention

However, even with the above-described advanced recognition algorithms, it is difficult to accurately recognize the gesture of the user, which is unstable and uncertain "movement", and there is a limit in improving recognition accuracy.

Therefore, the present disclosure proposes an information processing apparatus, an information processing method, and a program capable of further improving gesture recognition accuracy.

Solutions to Problems

According to the present disclosure, there is provided an information processing apparatus including: a context recognition unit that recognizes a context related to a user; a gesture recognition unit that recognizes a gesture of the user; and a setting change unit that changes a recognition setting of the gesture recognition unit on the basis of a recognition result of the context recognition unit.

Furthermore, according to the present disclosure, there is provided an information processing method including: recognizing a context related to a user; recognizing a gesture of the user; and changing a recognition setting in the gesture recognition unit on the basis of a recognition result of the context related to the user.

Moreover, according to the present disclosure, there is provided a program for causing a computer to function as: a context recognition unit that recognizes a context related to a user; a gesture recognition unit that recognizes a gesture of the user; and a setting change unit that changes a recognition setting of the gesture recognition unit on the basis of a recognition result of the context recognition unit.

Effects of the Invention

As described above, according to the present disclosure, it is possible to further improve gesture recognition accuracy.

Note that the above-described effect is not necessarily limitative, and any of the effects shown in this specification together with the above-described effect or instead of the above-described effect, or other effects that can be grasped from this specification may be exhibited.

BRIEF DESCRIPTION OF DRAWINGS

FIG. 7 is an explanatory diagram showing another example of a finger gesture in the same embodiment.

FIG. 11 is an explanatory diagram explaining Example 1 according to the same embodiment.

FIG. 12 is an explanatory diagram explaining Example 2 according to the same embodiment.

FIG. 13 is an explanatory diagram explaining Example 3 according to the same embodiment.

FIG. 14 is an explanatory diagram explaining Example 4 according to the same embodiment.

FIG. 15 is an explanatory diagram (part 1) for explaining Example 5 according to the same embodiment.

FIG. 16 is an explanatory diagram (part 2) explaining Example 5 according to the same embodiment.

FIG. 17 is an explanatory diagram explaining Example 6 according to the same embodiment.

FIG. 18 is an explanatory diagram explaining Example 7 according to the same embodiment.

FIG. 19 is an explanatory diagram explaining Example 8 according to the same embodiment.

MODE FOR CARRYING OUT THE INVENTION

Figure 1:
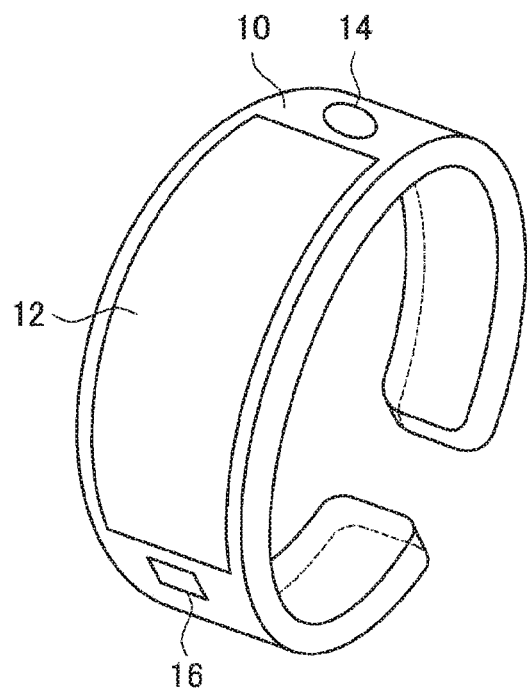
FIG. 1 is a diagram showing an appearance of an information processing apparatus 10 according to an embodiment of the present disclosure.

Preferred embodiments of the present disclosure will be described in detail below with reference to the accompanying drawings. Note that, in the present specification and the drawings, the same reference numerals are given to the constituent elements having substantially the same functional configuration, and redundant explanations are omitted.

Furthermore, note that description will be given in the following order.

1. Overview of Information Processing Apparatus 10 According to an Embodiment of the Present Disclosure
2. Background
3. Basic Configuration of Information Processing Apparatus 10 According to an Embodiment of the Present Disclosure
4. Information Processing Method According to an Embodiment of the Present Disclosure
5. Example
5.1 Example of Recognition Setting Change
5.2 Example of Context Related to User
5.3 Example of Command Change
6. Conclusion
7. Hardware Configuration 8. Supplement

1. Overview of Information Processing Apparatus 10 According to an Embodiment of the Present Disclosure First, the overview of an information processing apparatus 10 according to an embodiment of the present disclosure will be described with reference to FIG. 1 and FIG. 2. FIG. 1 is a diagram showing an appearance of the information processing apparatus 10 according to an embodiment of the present disclosure, and FIG. 2 is a diagram explaining a worn state of the information processing apparatus 10 according to the present embodiment.

Figure 2:
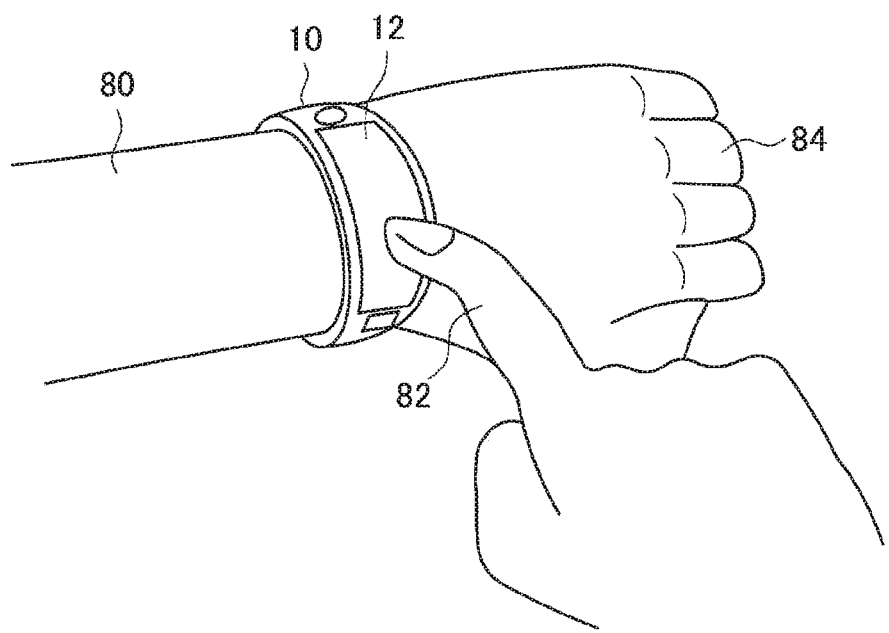
FIG. 2 is a diagram explaining a worn state of the information processing apparatus 10 according to the same embodiment.

As shown in FIG. 1 and FIG. 2, the information processing apparatus 10 according to the present embodiment is a wearable terminal worn on a user's arm 80 or wrist and is also referred to as a wristband type/wristwatch type terminal. A touch panel display 12 having functions as a display unit and an operation unit, a speaker 14, and a microphone 16 are provided on the outer circumferential surface of the information processing apparatus 10.

The touch panel display 12 is provided, for example, in a part of the outer circumferential surface of the information processing apparatus 10 so that a user can easily perform a touch operation. However, in the present embodiment, the present invention is not limited to this, and the touch panel display 12 may be provided on the entire outer circumferential surface of the information processing apparatus 10. The function of the display unit of the touch panel display 12 is realized by a display screen device such as a liquid crystal display or an organic electro luminescence (EL) display, for example, and displays characters, images and other information on a display screen. Moreover, display of characters, images, and other information by the display screen device is controlled by a device control unit 264 of a main control unit 26 as described later.

Furthermore, the function as the operation unit of the touch panel display 12 is realized by, for example, an operation surface that is superimposed on the above-described display screen device and detects a contact position by the user. The operation surface can be a curved surface along the outer circumferential direction of the user's arm 80.

Note that, in order to realize various functions in the information processing apparatus 10 which is a wristband type terminal, it is desirable to increase the area of the touch panel display 12. However, in a case where the touch panel display 12 has a large area for the arm 80 of the user, the wearability and operability of the wristband type terminal are reduced. Therefore, as shown in FIG. 2, the touch panel display 12 has a curved surface with a narrow width so as to follow the user's arm 80. As shown in FIG. 2, the user performs the touch operation with fingers 82 of the arm on which the information processing apparatus 10 is not worn while watching the display screen of the touch panel display 12 of the information processing apparatus 10 worn on the arm 80 of the user. Note that, in the following description, the finger of the arm 80 on which the information processing apparatus 10 is worn is referred to as a finger 84, and is shown as a finger of the left hand in FIG. 2. Furthermore, in the following description, the finger of the arm on which the information processing apparatus 10 is not worn is referred to as a finger 82, and is shown as a finger of the right hand in FIG. 2. Furthermore, in the embodiment described below, the information processing apparatus 10 is not limited to being worn on the left arm, and may be worn on the right arm.

The speaker 14 has a sound output function and is realized by a speaker provided in the vicinity of the touch panel display 12 on the outer circumferential surface of the information processing apparatus 10, as shown in FIGS. 1 and 2. Furthermore, the microphone 16 has a sound pickup function and is realized by a microphone provided in the vicinity of the touch panel display 12 on the outer circumferential surface of the information processing apparatus 10, as shown in FIGS. 1 and 2. Note that the number and the position of installation of the speaker 14 and the microphone 16 shown in FIG. 1 are merely examples, and the present embodiment is not limited thereto. For example, the speaker 14 and the microphone 16 may be provided in plural on the outer circumferential surface of the information processing apparatus 10.

2. Background

By the way, the information processing apparatus 10 which is the wristband type terminal as described above is worn on a user, recognizes the gesture of the user worn by the user, and can issue a command for information processing performed in the information processing apparatus 10 on the basis of a recognition result. However, as described above, it is difficult to accurately recognize the gesture of the user, which is unstable and uncertain "movement" or the like, and there is a limit in improving gesture recognition accuracy.

Specifically, in order to recognize the gesture of the user, the information processing apparatus 10 is provided with the motion sensor 18. The motion sensor 18 includes an acceleration sensor, a gyro sensor, and the like (note that details of the motion sensor 18 will be described later). Such a motion sensor 18 changes its state (sensor is hard to vibrate, or the like) according to the worn state of the user (for example, it is tightly fixed to the user's arm 80 or fixed loosely, or the like), so that the sensing tendency of the motion sensor 18 changes. As a result, even in a case where the user performs the same gesture, the obtained sensing results may be different. Furthermore, the sensing tendency changes also depending on the state of the user wearing the motion sensor 18, and changes depending on the influence of acceleration or the like by the user's motion between when the user is stationary and when the user is running.

Conventionally, in the information processing apparatus 10 as described above, gesture recognition is performed using a recognition engine that operates uniformly irrespective of the state of the user wearing the information processing apparatus 10, the worn state of the information processing apparatus 10, and the like. In other words, conventionally, in the information processing apparatus 10, a recognition engine that operates uniformly even when the sensing tendency of the motion sensor 18 changes is used. However, as described above, since the sensing tendency of the motion sensor 18 changes according to the state of the user or the like, in a case of using a recognition engine that operates uniformly, the gesture of the user cannot be recognized as a gesture intended by the user sometimes.

Therefore, in the present disclosure, according to the states, situations, and the like of the user as described above (in the following description, these are referred to as contexts related to the user), the information processing apparatus 10 that changes a recognition setting in gesture recognition such as a gesture recognition engine is proposed. According to the present disclosure, since the recognition setting is changed in accordance with the sensing tendency of the motion sensor 18 that changes according to the user's state or the like as described above, it is possible to expect further improvement in gesture recognition accuracy.

Note that, in the following description, the context means information related to the user such as the state of the user, the situation of the user, or the attribute of the user, and is information as a determination material for changing the recognition setting for recognizing the gesture. Furthermore, in the following description, a gesture means an action performed by a person to convey something. Specifically, the gesture is a form expressed in the form or orientation of a part of the body such as an arm or a hand, a body movement of moving a part of the body such as a hand or a fingertip, or the movement of the eye in order to transmit an instruction to the information processing apparatus 10 or the like. Moreover, in the following description, the recognition engine means a generic name of a mechanism (apparatus) and a program (including various settings) for executing information processing for recognizing a gesture of the user.

Figure 3:
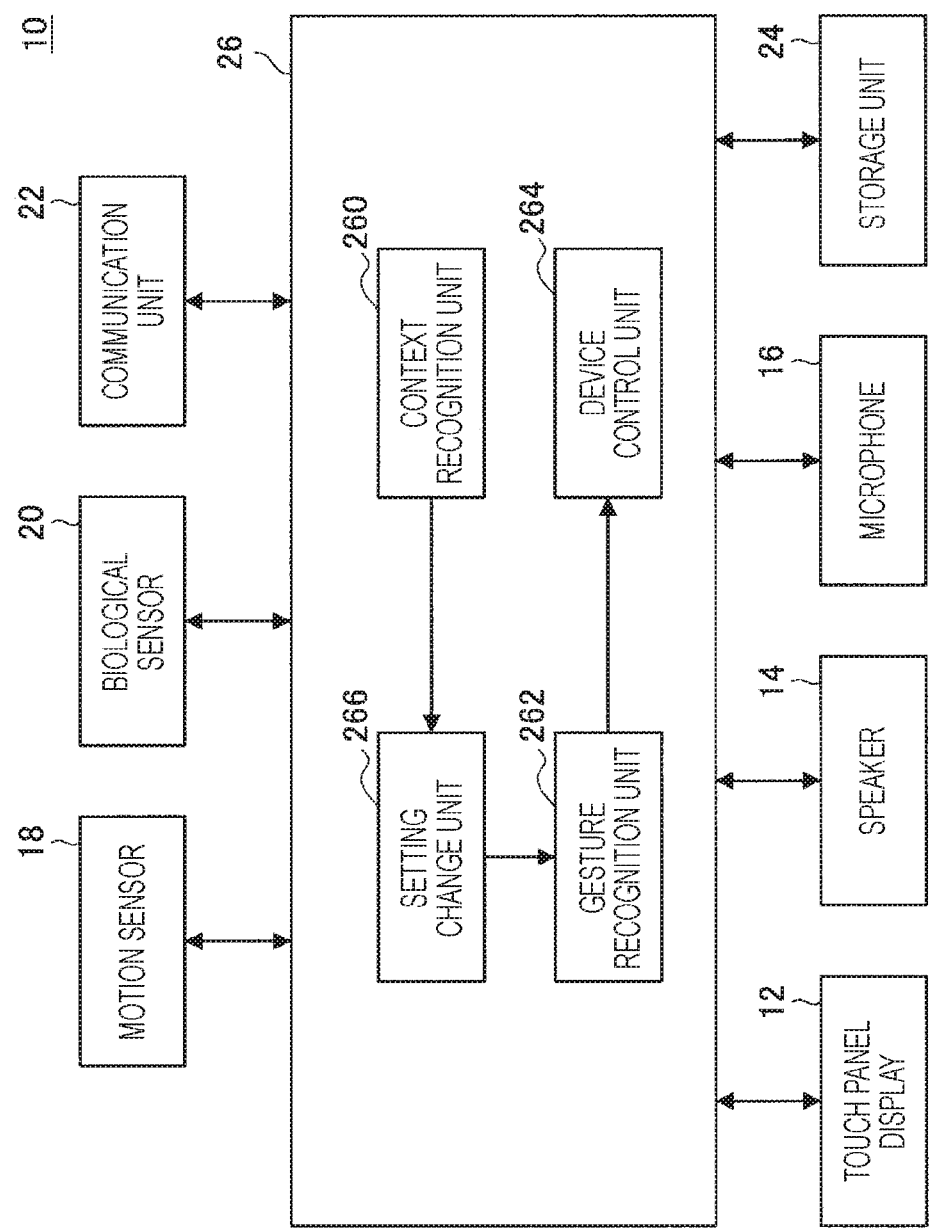
FIG. 3 is a block diagram showing a basic configuration of the information processing apparatus 10 according to the same embodiment.
Figure 4:
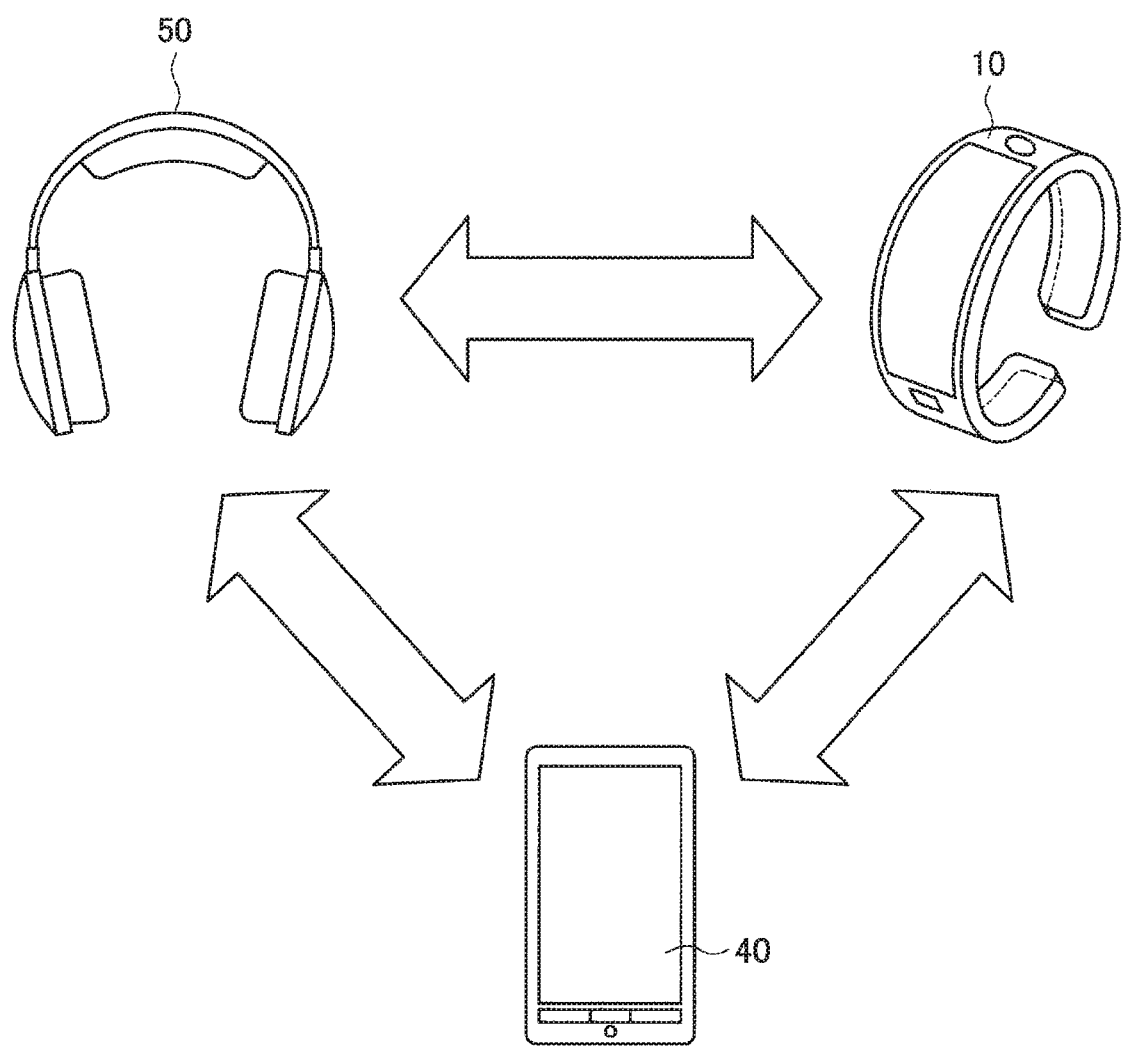
FIG. 4 is an explanatory diagram showing an example of a connection between the information processing apparatus 10 and an external device according to the same embodiment.
Figure 5:
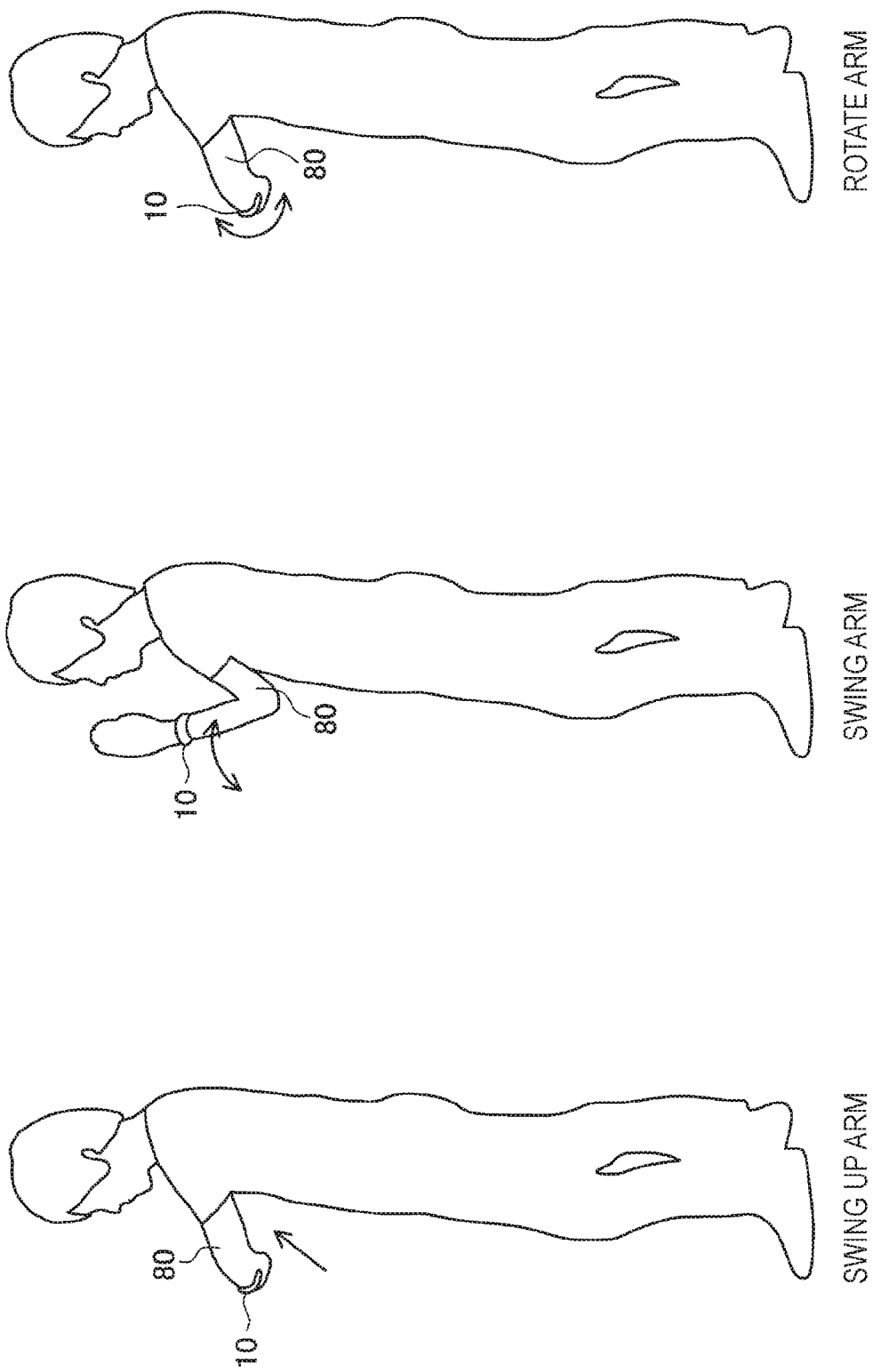
FIG. 5 is an explanatory diagram explaining an example of an arm gesture recognized by the information processing apparatus 10 according to the same embodiment.
Figure 6:
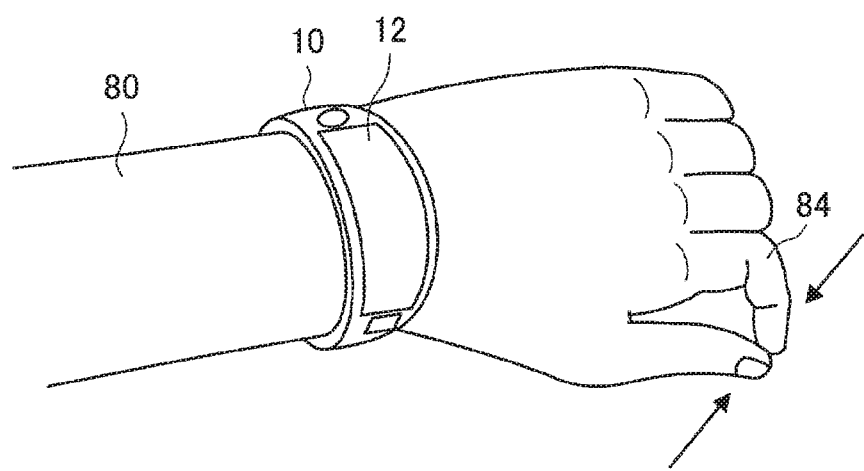
FIG. 6 is an explanatory diagram showing an example of a finger gesture in the same embodiment.
Figure 8:
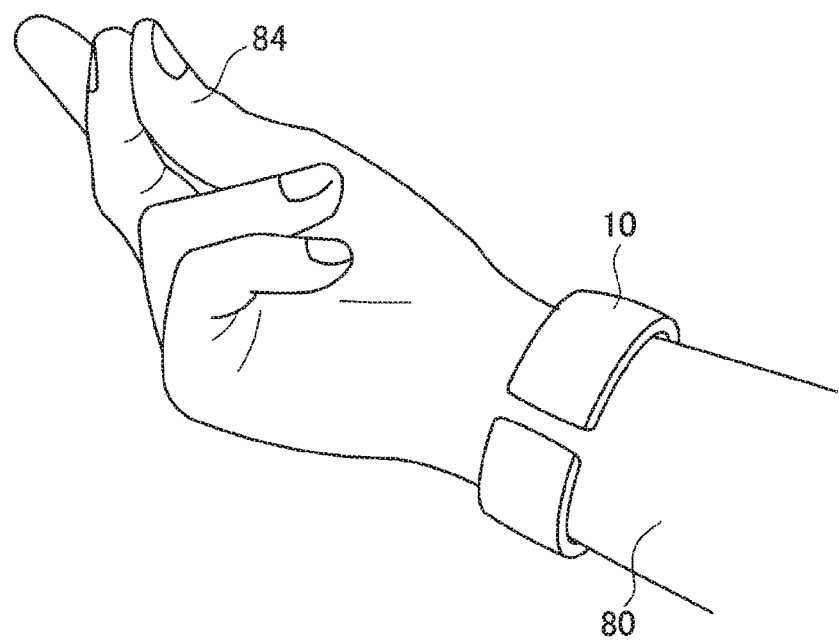
FIG. 8 is an explanatory diagram showing still another example of a finger gesture in the same embodiment.

3. Basic Configuration of Information Processing Apparatus 10 According to an Embodiment of Present Disclosure Hereinafter, a basic configuration of the information processing apparatus 10 according to an embodiment of the present disclosure will be described with reference to FIGS. 3 to 8. FIG. 3 is a block diagram showing a basic configuration of the information processing apparatus 10 according to the present embodiment. FIG. 4 is an explanatory diagram showing an example of a connection between the information processing apparatus 10 and an external device according to the present embodiment. Moreover, FIG. 5 is an explanatory diagram explaining an example of an arm gesture recognized by the information processing apparatus 10 according to the present embodiment. Furthermore, FIGS. 6 to 8 are explanatory diagrams showing an example of a finger gesture according to the present embodiment.

As described above, the information processing apparatus 10 according to the present embodiment is a wearable terminal worn on a user's arm 80 or wrist. As shown in FIG. 3, the information processing apparatus 10 mainly includes the touch panel display 12, the speaker 14, the microphone 16, the motion sensor 18, a biological sensor 20, a communication unit 22, a storage unit 24, and a main control unit 26. Hereinafter, each block of the information processing apparatus 10 according to the present embodiment will be described below.

(Touch panel display 12)

As described above, the touch panel display 12 is provided on the outer circumferential surface of the information processing apparatus 10 and has functions of a display unit and an operation unit.

(Speaker 14)

As described above, the speaker 14 is provided on the outer circumferential surface of the information processing apparatus 10 and has a function of outputting sound (audio signal). For example, the speaker 14 notifies the user by an alarm or the like, or outputs received sound during a call.

(Microphone 16)

As described above, the microphone 16 is provided on the outer circumferential surface of the information processing apparatus 10 and has a function of inputting sound (audio signal). For example, the microphone 16 accepts sound input by the user, and collects utterance sound of the user during a call.

(Motion sensor 18)

The motion sensor 18 is provided in the information processing apparatus 10 and is a sensor that detects a user's behavior (the user is walking or the like) and an action (gesture) of the user's arm 80 on which the information processing apparatus 10 is worn. As will be described later, the motion sensor 18 can also detect the action (finger gesture) of the user's fingertip. The motion sensor 18 is realized by one or a plurality of sensor devices that detects spatial movements and angles of, for example, an acceleration sensor, a gyro sensor, a geomagnetic sensor, a potentiometer, an encoder, or the like. One or a plurality of sensing results obtained by the motion sensor 18 is output to a main control unit 26 as described later, and is used when the user's behavior is recognized or gesture of the user is recognized in the main control unit 26.

Furthermore, the motion sensor 18 may also include an imaging element, and an imaging device that takes an image of a user using various members such as a lens for controlling image formation of a subject image on the imaging element. In this case, the action of the user, the movement of the eyes of the user (eyeball movement), or the like is captured in an image taken by the imaging device. The image which is the sensing result by the imaging device is output to the main control unit 26 as described later and is used in the main control unit 26 to recognize the action and the movement (gesture) of the line of sight of the user. Moreover, the motion sensor 18 may include an infrared sensor, an ultrasonic sensor, or the like that can recognize a gesture of the user. Note that such an imaging device, an infrared sensor, or the like may be provided in the information processing apparatus 10 or may be installed as a separate device from the information processing apparatus 10 around the user.

Moreover, the motion sensor 18 may include a positioning sensor. The positioning sensor is a sensor for detecting the position of the user wearing the information processing apparatus 10, and specifically, the positioning sensor may be a global navigation satellite system (GNSS) receiver or the like. In this case, the positioning sensor generates a sensing result indicating the latitude/longitude of the user's current location on the basis of the signal from the GNSS satellite. The sensing result by the positioning sensor is output to the main control unit 26 as described later, and is used in the main control unit 26 to detect the movement and the moving speed of the user from the change in the sensing result. Furthermore, since the relative positional relationship of the user can be detected from, for example, RADIO frequency identification(RFID), Wi-Fi access point, information of the radio base station, or the like, such a communication device can be used also as the above-described positioning sensor.

The motion sensor 18 according to the present embodiment can detect a gesture of the user and can also detect a user's behavior. The detected user's behavior is one of the contexts related to the user, and is one of the pieces of information as a determination material for changing the recognition setting for recognizing the gesture. In other words, the motion sensor 18 according to the present embodiment can acquire the sensing result for recognizing the context related to the user, and acquire the sensing result for recognizing the gesture of the user. Note that, in the above description, the motion sensor 18 is described as capable of acquiring both the sensing result for recognizing the context and the sensing result for recognizing the gesture, but the present embodiment is not limited to this. For example, the motion sensor 18 may separately have a sensor that obtains a sensing result for the context and a sensor that obtains a sensing result for the gesture.

(Biological Sensor 20)

The biological sensor 20 is provided in the information processing apparatus 10 and is a sensor that detects biological information of the user. For example, the biological sensor 20 includes one or a plurality of sensors that is directly or indirectly worn on a part of the user's body, and measure the user's heart rate, blood pressure, electroencephalogram, respiration, perspiration, myoelectric potential, skin temperature, skin electrical resistance, or the like. One or a plurality of pieces of biometric information obtained by the biological sensor 20 is output to a main control unit 26 as described later, and used in the main control unit 26 to recognize the context of the user.

Moreover, in addition to the motion sensor 18 and the biological sensor 20 described above, the information processing apparatus 10 according to the present embodiment may further include various sensors such as a pressure sensor (not shown) that detects the worn state of the information processing apparatus 10 to the user's arm 80, or a temperature sensor (not shown) that measures the ambient temperature around the user.

(Communication Unit 22)

As shown in FIG. 4, the information processing apparatus 10 according to the present embodiment can be connected to an external device such as a smartphone 40 or a headset 50 possessed by a user by wireless communication, wired communication, or the like. In other words, the communication unit 22 is a communication interface provided in the information processing apparatus 10, having a function of connecting to the above-described external device and transmitting and receiving data. For example, the communication unit 22 may be connected to the smartphone 40, the headset 50, or the like to transmit and receive data, or may be connected to a predetermined server 60 via a network 70 to transmit and receive data (see FIG. 21). Furthermore, the communication unit 22 also functions as a sensor detecting the type of the external device connected to the information processing apparatus 10 or the state of the external device (the type of the application being activated or the like) by transmitting and receiving data with the smartphone 40 or the like possessed by the user. Note that the communication unit 22 is realized by a communication device such as a communication antenna, a transmission and reception circuit, a port, or the like. Furthermore, in the present embodiment, the external device is not limited to the smartphone 40 and the headset 50 as shown in FIG. 4, but may be a tablet, a laptop personal computer (PC), a notebook PC, an head mounted display (HMD), or the like.

(Storage Unit 24)

The storage unit 24 is provided in the information processing apparatus 10, and stores programs for the main control unit 26 as described later to execute various processes, or the like. For example, the storage unit 24 stores a program for a device control unit 264 (as described later) to issue a command according to the recognized gesture. Note that the storage unit 24 is realized by a magnetic recording medium such as a hard disk (HD), a nonvolatile memory such as a flash memory, or the like, for example.

(Main Control Unit 26)

The main control unit 26 is provided in the information processing apparatus 10, and can control each block of the information processing apparatus 10. The main control unit 26 is realized by hardware such as a central processing unit (CPU), a read only memory (ROM), or a random access memory (RAM), for example. Furthermore, the main control unit 26 can also function as a context recognition unit 260, a gesture recognition unit 262, a device control unit (command issuing unit) 264, and a setting change unit 266. Details of these functions of the main control unit 26 according to the present embodiment will be described below.

—Context recognition unit 260—

The context recognition unit 260 recognizes the context related to the user. Then, the recognition result of the context recognition unit 260 is output to the setting change unit 266 as described later. Furthermore, the recognition result of the context recognition unit 260 may be displayed on the touch panel display 12 described above, or may be output to the user via the speaker 14 described above.

The context recognition unit 260 recognizes the context related to the user on the basis of one or a plurality of sensing results by the motion sensor 18 described above. Specifically, the context recognition unit 260 can recognize the user's behavior such as the user is sitting, the user is running, or the user is on a train, as one of the contexts related to the user, on the basis of the sensing result of the motion sensor 18 described above. For example, in a case where a change in acceleration or a change in position of the user is not detected by the motion sensor 18 for a certain period of time, the context recognition unit 260 recognizes that the user is in a stationary state such as sleeping. At this time, the context recognition unit 260 can also recognize, for example, whether the user is sleeping on his/her back or lying sideways by the orientation of the information processing apparatus 10 detected by the motion sensor 18 or the like. Furthermore, the context recognition unit 260 can also recognize the user's behavior such as user is running on the basis of the fact that the motion sensor 18 detects a sudden change in acceleration, a direction change, or the like, for example. Moreover, the context recognition unit 260 can also recognize that the user is on an automobile on the basis of the fact that the motion sensor 18 detects the movement and direction change of the user at high speed, for example. Note that the context recognition unit 260 may recognize the user's behavior by various values detected by the motion sensor 18. Alternatively, the context recognition unit 260 may recognize the user's behavior by matching the pattern of the sensing results (the behavior of the sensing results) obtained by the motion sensor 18 with teacher data (the pattern obtained by known behavior).

Furthermore, the context recognition unit 260 may recognize the worn state of the information processing apparatus 10 to the user's arm 80 on the basis of the detection result by the above-described pressure sensor (not shown). More specifically, the context recognition unit 260 can recognize whether the information processing apparatus 10, which is a wristband type terminal, is tightly fixed to the user's arm 80, or is loosely fixed to the user's arm 80 on the basis of the detection result of the pressure sensor. Moreover, the context recognition unit 260 may recognize whether the arm 80 on which the information processing apparatus 10 is worn is the right arm or the left arm of the user by the direction of the acceleration detected by the motion sensor 18.

Furthermore, the context recognition unit 260 may recognize the state of the user on the basis of various types of biological information (heart rate, blood pressure, electroencephalogram, respiration, perspiration, myopotential, skin temperature, skin electrical resistance, or the like) detected by the biological sensor 20 described above. For example, the context recognition unit 260 may recognize that the user is exercising, excited, or the like from the heart rate of the user by the biological sensor 20.

Furthermore, the context recognition unit 260 may recognize the type and state of the user terminal (external device) used by the user through the communication by the communication unit 22 described above. Specifically, the context recognition unit 260 can recognize the type of an external device such as the smartphone 40 connected to the information processing apparatus 10, the type of the application to be activated by the external device, the type of the device connected to the external device, or the like, via the communication unit 22. Note that, as a device connected to the external device, for example, in a case where the external device is the smartphone 40, the headset 50 connected to the smartphone 40 can be cited. By the way, since the state of the external device recognized by the context recognition unit 260 is information associated with the use of the terminal of the user, it can be said that the state is information indicating the state of the user. For example, in a case where the user terminal is the smartphone 40 and a music player application is activated in the smartphone 40, it can be presumed that the user is listening to music.

Moreover, the context recognition unit 260 may acquire attribute information of the user and an action schedule. Specifically, the context recognition unit 260 may acquire attribute information such as the sex and age of the user, and information associated with the behavior schedule including the scheduled user's behavior and its scheduled date and time, for example. Note that the attribute information and the behavior schedule may be input to the information processing apparatus 10 in advance or may be acquired from the external server 60 (see FIG. 21) via the communication unit 22 described above.

—Gesture recognition unit 262—

The gesture recognition unit 262 recognizes a gesture of the user on the basis of one or a plurality of sensing results by the motion sensor 18 that detects the action of the user. Then, the recognition result of the gesture recognition unit 262 is output to the device control unit 264 as described later. Furthermore, the recognition result of the gesture recognition unit 262 may be displayed on the touch panel display 12, or may be output to the user via the speaker 14 described above.

For example, as shown in FIG. 5, the gesture recognition unit 262 can recognize the action of the user of swinging up the arm 80 on which the information processing apparatus 10 is worn, swinging the arm 80 right and left, rotating the arm 80, or the like as a predetermined gesture (arm gesture). Note that, in the following description, the action of the user of swinging up the arm 80 refers to an action of bending and raising the arm 80, as shown in the left side of FIG. 5, from the state in which the user's arm 80 is down, such as the action performed when the user watches at a wristwatch. Furthermore, the action of rotating the user's arm 80 refers to an operation of rotating the center of the arm 80 as a rotation axis, as shown on the right side of FIG. 5. In other words, the gesture of "rotating the arm" may be regarded as the gesture of "rotating the wrist."

Furthermore, the gesture recognition unit 262 may recognize the movement of the finger 84 of the arm 80 on which the information processing apparatus 10 is worn as a predetermined gesture. For example, the gesture recognition unit 262 can detect the type of the finger gesture by the finger 84 such as a pinch action of pinching with the index finger 84 and the thumb 84, a swipe action of moving the index finger 84 in a specific direction, a tap action of tapping the fingertips, a finger flick action of flicking the fingertip, or a finger snap action of moving the fingers to snap the fingers. For example, in the following description, as shown in FIG. 6, the tap action refers to an action of bringing the fingertips of the two fingers 84 of the arm 80 on which the information processing apparatus 10 is worn, in contact with each other and then releasing the fingers. Note that, although FIG. 6 shows the tap action using the thumb and the index finger, the present embodiment is not limited to this, and may be a tap action using another finger and the thumb. Furthermore, as shown in FIG. 7, the finger flick action is action of pressing the middle finger 84 of the arm 80 on which the information processing apparatus 10 is worn with the thumb 84 and then releasing the middle finger 84 from the pressing with the thumb 84 to snap the fingers. In other words, the finger flick action is the action of a finger performed when snapping marbles, tiddlywinks or the like. Note that, although FIG. 7 shows the finger flick action using the middle finger, the present embodiment is not limited to this, and may be a finger flick action using another finger and the thumb. Moreover, as shown in FIG. 8, the finger snap action is an action of rubbing the thumb 84 and the middle finger 84 of the arm 80 on which the information processing apparatus 10 is worn and then hitting the middle finger 84 to the base of the thumb 84. In other words, the finger snap action is the action of the finger performed when snapping the fingers. Note that, although FIG. 8 shows the finger snap action using the middle finger, the present embodiment is not limited to this, and may be a finger snap action using another finger and the thumb. Moreover, in the present embodiment, the type of the finger gesture recognized by the gesture recognition unit 262 is not limited to the above-described action, and is not particularly limited as long as the gesture is performed using the finger 84.

Furthermore, the gesture recognition unit 262 is not limited to only recognizing the type of finger gesture, and can recognize the type of the finger such as the number of times the finger gestures are performed, which fingers (thumb, index finger, middle finger, ring finger, or little finger) is the finger 84 that has performed the finger gesture.

Moreover, the gesture recognition unit 262 may recognize the performing of the finger gesture or the number of times the finger gestures are performed by analyzing the environmental sound picked up by the microphone 16, and extracting the sound of a specific frequency caused by the finger gesture by the user's finger 82.

Note that, in the above description, the movement of the arm 80 on which the information processing apparatus 10 is worn, or the finger 84 is recognized, but the present embodiment is not limited to this. For example, the gesture recognition unit 262 may recognize the movement of the arm 80 on which the information processing apparatus 10 is not worn, or the finger 82.

Moreover, the gesture recognition unit 262 may recognize the movement of the line of sight of the user as a predetermined gesture. For example, the gesture recognition unit 262 may recognize quick movement of the user's line of sight as a gesture similar to the flick action performed with the finger, and may recognize the slow movement of the line of sight of the user as a gesture that is similar to a drag operation performed with the finger.

Note that the gesture recognition unit 262 may recognize the gesture by various values detected by the motion sensor 18. Alternatively, the gesture recognition unit 262 may recognize the gesture by matching the pattern of the sensing results (the behavior of the sensing results) obtained by the motion sensor 18 with teacher data (the pattern obtained by known gesture).

Furthermore, the gesture recognition unit 262 may increase the accuracy of the gesture recognition by considering the tendency of the gesture of the user by machine learning. For example, during the activation, the information processing apparatus 10 associates a recognition result with a sensing result used for the recognition in recognition of the gesture to store the associated results. Moreover, the information processing apparatus 10 presumes whether or not the recognized gesture is a gesture intended by the user, from the operation of the user with respect to the information processing apparatus 10 after the command issued on the basis of the recognized gesture is executed. Specifically, in a case where the user does not stop the command after the execution of the command is started, it is presumed that the command is the one the user desired and the gesture corresponding to the command is correctly recognized as a gesture intended by the user. Then, in a case where it is presumed that the gesture is intended by the user, the information processing apparatus 10 sets the sensing result related to the gesture as a teacher signal related to the gesture for newly performing gesture recognition. As a result, it is possible to perform gesture recognition reflecting the tendency of the gesture of the specific user wearing the information processing apparatus 10, so that the accuracy of the gesture recognition can be further improved.

—Device control unit 264—

The device control unit 264 issues commands for various devices provided in the information processing apparatus 10 to perform predetermined processing on the basis of the gesture recognized by the gesture recognition unit 262 described above, and controls the various devices. Specifically, a command to be issued is associated with each gesture, and the device control unit 264 issues a command corresponding to the gesture recognized by the gesture recognition unit 262 and controls various devices. For example, the device control unit 264 controls ON/OFF of various devices such as the touch panel display 12, the speaker 14, and the microphone 16, and performs controls such as scrolling, selection, determination, cancellation, and the like on the display on the touch panel display 12. Furthermore, the device control unit 264 may control an external device such as the smartphone 40 connected to the information processing apparatus 10. Moreover, the device control unit 264 may change the command associated with the gesture according to the context related to the user.

—Setting Change Unit 266—

The setting change unit 266 changes the recognition setting related to the gesture recognition by the gesture recognition unit 262 on the basis of the recognition result of the context recognition unit 260 described above.

For example, the setting change unit 266 may change the setting of the recognition algorithm used when the gesture recognition unit 262 performs gesture recognition. More specifically, a threshold in a recognition algorithm is predetermined for each user context related to the user, such as an action of the user, and the setting change unit 266 changes the threshold according to the recognition result of the context recognition unit 260. In this case, for example, the threshold refers to a condition that serves as a boundary when determining whether the sensing result is caused by the gesture A or the gesture B with respect to the sensing result. Therefore, even in a case where the same sensing result is obtained, since the threshold changes according to the context related to the user, the recognition result of the gesture recognition unit 262 may be different.

Furthermore, for example, the setting change unit 266 may change the detection setting of the motion sensor 18 described above as a change in the recognition setting. In detail, the setting change unit 266 may change the threshold of various sensors included in the motion sensor 18 as an example of the detection setting. In this case, for example, the threshold refers to the lowest value at which various sensors can recognize gestures. Furthermore, the setting change unit 266 may change the sensing time, the sensing interval (sampling frequency), or the like of various sensors. Moreover, the setting change unit 266 may change the range (for example, the frequency band) for outputting of the values obtained by various sensors to the gesture recognition unit 262 as the sensing result.

Furthermore, for example, the setting change unit 266 may change the type of the sensing result acquired by the gesture recognition unit 262, in other words, the type of the sensor used in the recognition of the gesture of the user. Specifically, it is assumed that the motion sensor 18 described above includes, for example, an acceleration sensor and a gyro sensor. In such a case, the setting change unit 266 sets such that the gesture recognition is performed using the sensing result of the acceleration sensor and the gyro sensor, or sets such that the gesture recognition is performed using only the sensing result of the acceleration sensor according to the context related to the user. Moreover, the setting change unit 266 may perform weighting on various sensing results used in gesture recognition according to the context related to the user. In detail, the setting change unit 266 may perform weighting on the sensing result of the gyro sensor with a high weight so that the sensing result of the acceleration sensor is reflected by the gesture recognition, as compared with the sensing result of the gyro sensor.

Furthermore, for example, the setting change unit 266 may change the type of the gesture to be recognized by the gesture recognition unit 262 as described later. Specifically, for example, it is assumed that the gesture recognition unit 262 can recognize, as gestures, three actions, that is, an action of swinging up the arm 80, an action of swinging the arm 80 right and left, and an action of rotating the arm 80. In such a case, the setting change unit 266 sets such that all of the above three actions are recognized as a gesture, or sets such that two of the above three actions are recognized as a gesture.

Moreover, the setting change unit 266 may implement with combination of any of the plurality of setting changes described above. Furthermore, the setting change unit 266 may change the recognition engine. Here, as described above, the recognition engine means a mechanism and a program (including various settings) for executing information processing for recognizing a gesture of the user. Specifically, the setting change unit 266 performs setting to the recognition engine prepared for each context of the user to set the type of the sensor, the detection setting of the sensor, the type of the gesture to be recognized, or the like, which is optimized specifically for each context.

In other words, in the present embodiment, the content of the recognition setting to be changed by the setting change unit 266 is not limited, and the setting change unit 266 can change various recognition settings for recognizing the gesture of the user according to the context related to the user.

Figure 9:
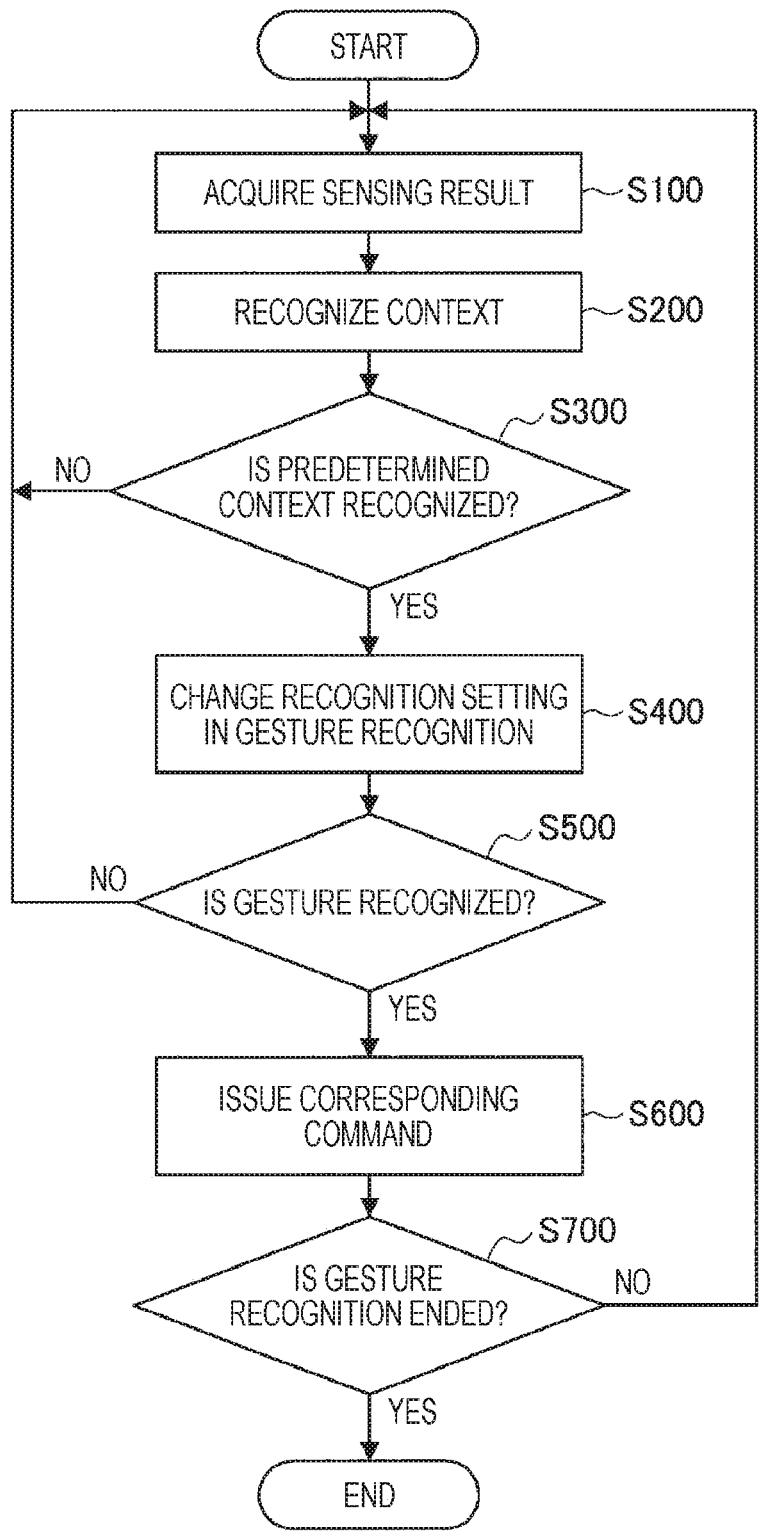
FIG. 9 is a flow diagram explaining an information processing method according to the same embodiment.

4. Information Processing Method According to an Embodiment of the Present Disclosure The configuration of the information processing apparatus 10 according to the present embodiment has been described in detail above. Next, an information processing method according to an embodiment of the present disclosure will be described. The general flow of the information processing method in the present embodiment will be described. First, the information processing apparatus 10 recognizes the context related to the user. Next, the information processing apparatus 10 changes the recognition setting in recognition of the gesture on the basis of the recognition result of the context related to the user. Moreover, the information processing apparatus 10 recognizes the gesture of the user in a state in which the recognition setting is changed, and issues a command for information processing on the basis of the recognized gesture. The information processing method according to the present embodiment will be described below with reference to FIG. 9. FIG. 9 is a flow diagram explaining an information processing method according to the present embodiment.

(Step S100)

The information processing apparatus 10 acquires one or a plurality of sensing results by the motion sensor 18 described above. Note that, in step S100, the information processing apparatus 10 is not limited to acquiring the sensing results described above, but may acquire other information such as biological information obtained from the user, wearing state of the information processing apparatus 10, or the like, together with the sensing results.

(Step S200)

The information processing apparatus 10 recognizes the context related to the user on the basis of the acquired one or a plurality of sensing results. For example, the information processing apparatus 10 recognizes the user's behavior (for example, the user is running, or the like).

(Step S300)

The information processing apparatus 10 determines whether or not a predetermined context has been acquired. For example, the information processing apparatus 10 determines whether or not the user is recognized as running. In a case where the predetermined context is recognized, the information processing apparatus 10 proceeds to step S400 as be described later, and in a case where the predetermined context is not recognized, the information processing apparatus 10 returns to the step S100 described above.

(Step S400)

The information processing apparatus 10 changes the recognition setting in recognition of the gesture on the basis of the recognition result of the context related to the user. For example, the information processing apparatus 10 changes the detection setting of the motion sensor 18.

(Step S500)

The information processing apparatus 10 determines whether or not the user has recognized a predetermined gesture. For example, the information processing apparatus 10 recognizes a gesture that the user swings up the arm 80 on the basis of the sensing result of the motion sensor 18. When the predetermined gesture is recognized, the information processing apparatus 10 proceeds to step S600 as described later, and when the predetermined gesture is not recognized, the information processing apparatus 10 returns to the step S100 described above.

(Step S600)

The information processing apparatus 10 issues a command corresponding to the recognized gesture on the basis of the gesture recognized in step S500. For example, the information processing apparatus 10 issues a music reproduction command corresponding to a gesture of swinging up the arm.

(Step S700)

In a case where the information processing apparatus 10 receives an instruction to end the gesture recognition (for example, an instruction to stop activation of the information processing apparatus 10) from the user, the information processing apparatus 10 ends the information processing according to the present embodiment. On the other hand, in a case where the information processing apparatus 10 has not received an instruction to end the gesture recognition from the user, the information processing apparatus 10 returns to step S100 described above. In other words, steps S100 to S700 described above are repeated as long as there is no instruction from the user. For example, the information processing according to the present embodiment shown in FIG. 9 is repeatedly performed as one of the background processing of the information processing apparatus 10.

Note that, as shown in FIG. 9, in a case where the information processing according to the present embodiment is repeatedly performed, context recognition and change of recognition setting are repeated, in other words, the recognition setting of the gesture recognition unit 262 is dynamically changed according to the context. Accordingly, the recognition setting is optimized according to the context, and the accuracy of the gesture recognition is improved.

Moreover, in a case where the information processing according to the present embodiment is repeatedly performed, the recognition of the context is performed in the state of the recognition setting changed in advance. Specifically, in a case where the context recognition unit 260 newly recognizes the context, the motion sensor 18 is maintained at the previously detected detection setting, in other words, the new recognition is performed on the basis of the sensing result of the motion sensor 18 changed in setting.

Figure 10:
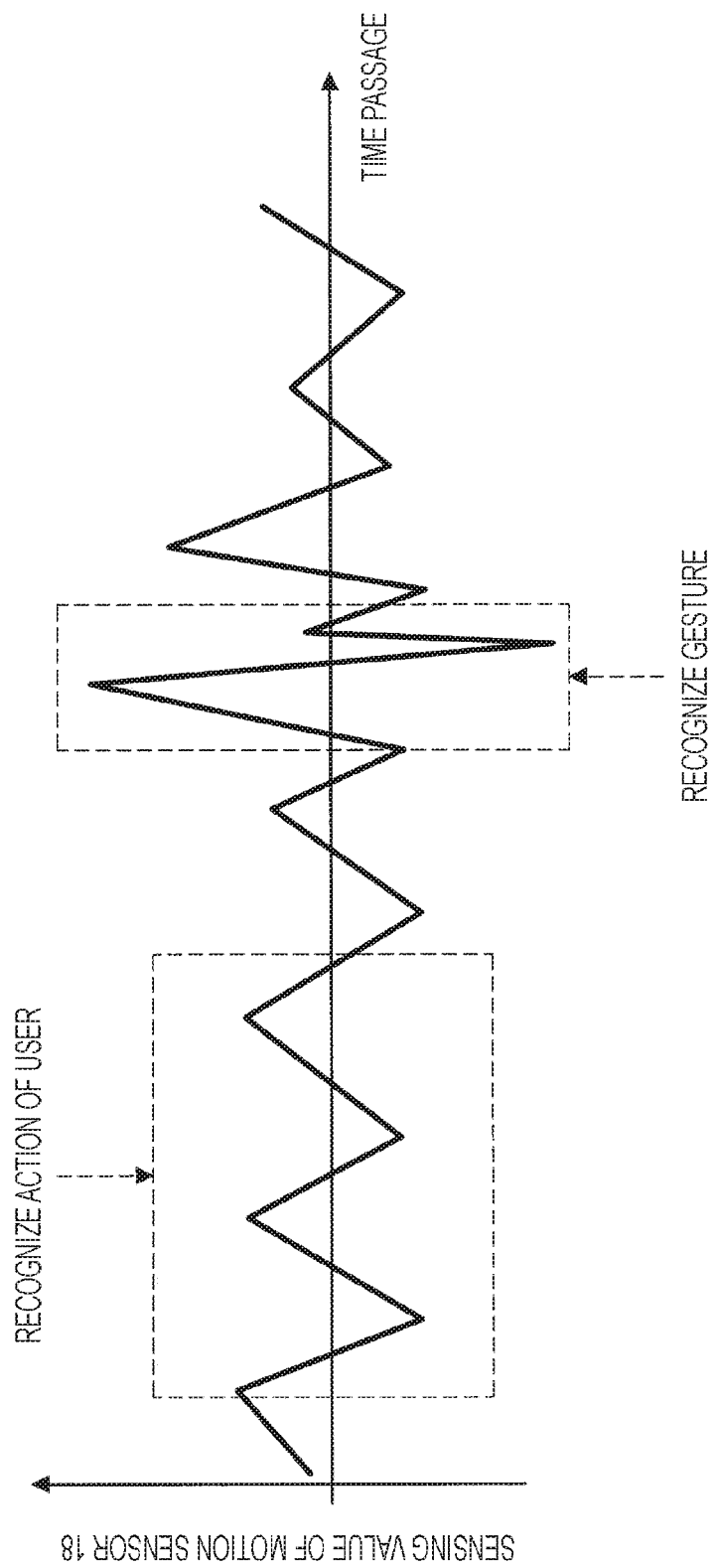
FIG. 10 is an explanatory diagram showing an example of sensing of a motion sensor 18 according to the embodiment.

Furthermore, as described above, recognition of the context related to the user and recognition of the gesture of the user can be performed on the basis of the sensing result by the motion sensor 18. However, even though the sensing result used in the gesture recognition and the sensing result used in context recognition are obtained from the same motion sensor 18, there are cases where there is a difference in the time width or the like in acquisition of the sensing result. An example of the difference in the sensing results will be described below with reference to FIG. 10. FIG. 10 is an explanatory view showing an example of sensing of the motion sensor 18 according to the present embodiment, and specifically shows a change in sensing value acquired by the motion sensor 18 over time. Note that, FIG. 10 shows a sensing value (for example, a sensing value by an acceleration sensor that senses acceleration in the X-axis direction) by one of the various sensors of the motion sensor 18.

As shown in FIG. 10, for example, the sensing value acquired at the beginning of the information processing according to the present embodiment is used to recognize the user's behavior, which is one of the contexts related to the user. Note that, in order to accurately recognize the user's behavior such as the user is running, walking, or the like, it is preferable that the time width (detection time) for acquiring the sensing value be long, for example, the sensing values are acquired for several minutes to several tens minutes. Next, in the information processing according to the present embodiment, after the sensing value for recognizing the user's behavior is acquired, the recognition setting is changed on the basis of the sensing value or the like, and the process moves to the stage of recognizing the gesture of the user. Since the gesture of the user swinging the arm 80 is performed in a shorter time than the user's behavior described above, the time width for acquiring the sensing value is short, for example, the sensing value is acquired for several seconds to several minutes. Accordingly, the sensing result used in the gesture recognition and the sensing result used in the context recognition have different time widths in acquisition of the sensing result.

Note that, in the present embodiment, the difference between the sensing result used in the gesture recognition and the sensing result used in context recognition is not limited to the difference as described above. For example, the user's behavior such as the user is running causes a slow numerical change, and the gesture of the user such as the user swinging the arm 80 causes a sharp numerical change. Due to such a difference, the number of times of sampling of the sensing result used for the gesture recognition per predetermined time may become larger than the number of times of sampling of the sensing result used for context recognition in some cases. In detail, since a sharp numerical change occurs in gestures, in order to accurately capture the behavior of numerical value related to gesture, it is required to increase the sampling frequency and to perform sampling finely in terms of time. On the other hand, in the user's behavior, since a slow numerical change occurs, it is unnecessary to increase the sampling frequency in order to capture the behavior of the numerical value related to the behavior, and the it is preferable that the sampling frequency be lowered in consideration of the power consumption or the like of the sensor. For example, while the sampling frequency of the sensing result used in the gesture recognition is about several tens Hz, the sampling frequency of the sensing result used for context recognition may be about several Hz or less.

5. Example

The details of the information processing method in the present embodiment have been described above. Next, an example of information processing according to the present embodiment will be described more specifically while showing a specific example. Note that the following embodiments are merely examples of information processing according to the present embodiment, and the information processing according to the present embodiment is not limited to the following example.

5.1 Example of Recognition Setting Change

First, a description will be given of Example 1 to Example 4 which describe the change of the recognition setting in the gesture recognition unit 262.

Example 1

First, with reference to FIG. 11, Example 1 in which the threshold of the sensor is changed according to the user's behavior will be described. FIG. 11 is an explanatory diagram for explaining Example 1 according to the present embodiment, and specifically shows an example of a threshold of a sensor according to the user's behavior.

As shown in FIG. 11, in the first embodiment, the setting change unit 266 changes the threshold of the sensor included in the motion sensor 18 according to the user's behavior that is the context of the user. Note that, as described above, the threshold of the sensor refers to the lowest value at which the sensor can recognize the gesture. For example, when the user is sleeping, the setting change unit 266 sets the threshold high (in FIG. 11, the threshold is set to 9), and during the sleep of the user, the motion sensor 18 hardly recognizes the gesture of the user. In other words, by setting the threshold high, for example, although the motion sensor 18 recognizes a gesture that greatly changes acceleration or the like, hardly recognizes a gesture that changes the acceleration or the like to small. In a case where the user is sleeping, the probability of trying to operate the information processing apparatus 10 is considered to be low, and even in a case where the user performs an action similar to a specific gesture, there is a high possibility that the user does not intend to operate the information processing apparatus 10. Therefore, by setting the threshold of the sensor high during sleep of the user, the gesture recognition unit 262 can avoid erroneously recognizing the behavior of the sleeping user as a specific gesture not intended by the user. As a result, in Example 1, on the basis of the erroneous recognition of the gesture, it is possible for the device control unit 264 to avoid issuing a command not intended by the user, and avoid a malfunction of the information processing apparatus 10.

Furthermore, in a case where the user is stationary such as sitting, standing or the like, the setting change unit 266 sets the threshold of the sensor low (in FIG. 11, the threshold is set to 1), so that the motion sensor 18 can recognize even a gesture that changes the acceleration or the like to small. In a case where the user is stationary, since the motion sensor 18 is not affected by the acceleration or the like caused by the traveling of the user (the user's behavior) or the like, the fact that the sensing tendency of the motion sensor 18 changes may not be taken into consideration. For example, the acceleration detected by the motion sensor 18 is only the acceleration by the gesture of the user in a case where the user is stationary. On the other hand, the acceleration detected by the motion sensor 18 may be the sum of the acceleration due to running of the user and the acceleration due to the gesture of the user during running of the user. In other words, the sensing tendency of the motion sensor 18 changes according to the user's behavior or the like, but in a case where the user is stationary, the influence of the action of the user or the like need not be taken into consideration. Therefore, in Example 1, in a case where the user is stationary, the threshold of the sensor is lowered to perform setting such that the gesture is easily recognized. Furthermore, in a case where the user is stationary, it is considered that the probability that the user operates the information processing apparatus 10 is high, and increasing the accuracy of recognition of the gesture of the user under such circumstances also increases the convenience of the information processing apparatus 10.

Moreover, in a case where the user is moving by him/herself such as walking or running, the setting change unit 266 sets the threshold of the sensor high (in FIG. 11, the threshold is set to 3 or 5). As a result, for example, although the motion sensor 18 recognizes a gesture that greatly changes acceleration or the like, hardly recognizes a gesture that changes the acceleration or the like to small. In a case where the user is moving by himself/herself, since there is an influence by the behavior of the user, the sensing tendency of the motion sensor 18 changes as described above. Accordingly, in Example 1, in a case where the user is moving by himself/herself, the threshold of the sensor is changed in consideration of the influence of the user's behavior on the motion sensor 18. As a result, the information processing apparatus 10 can recognize the gesture with high accuracy even if there is an influence by the user's behavior.

Then, in a case where the user is moving on a vehicle such as on a train, the setting change unit 266 sets the threshold of the sensor high (in FIG. 11, the threshold is set to 8). As a result, for example, although the motion sensor 18 recognizes a gesture that greatly changes acceleration or the like, hardly recognizes a gesture that changes the acceleration or the like to small. In a case where the user is moving with a vehicle, since there is an influence by the movement of the vehicle (for example, uniform motion of the vehicle, acceleration motion, or the like) similarly to a case where the user is moving by himself/herself, the sensing tendency of the motion sensor 18 changes. Accordingly, in Example 1, in a case where the user is moving with a vehicle, the threshold of the sensor is changed in consideration of the influence of the movement with a vehicle in the motion sensor 18. As a result, the information processing apparatus 10 can recognize the gesture accurately even if there is an influence of the movement of the vehicle.

Example 2

Next, referring to FIG. 12, Example 2 in which the type of sensor used for gesture recognition is changed in accordance with the user's behavior will be described. FIG. 12 is an explanatory diagram for explaining Example 2 according to the present embodiment, and specifically shows an example of the type of a sensor used in gesture recognition according to the user's behavior.

As shown in FIG. 12, in Example 2, the setting change unit 266 changes the type of the sensor used for gesture recognition according to the user's behavior that is the context of the user. In other words, the setting change unit 266 changes the type of the sensing result (for example, the sensing result by the acceleration sensor, the sensing result by the gyro sensor, or the like) acquired by the gesture recognition unit 262. For example, in a case where the user is stationary, the setting change unit 266 sets the acceleration sensor among the various sensors of the motion sensor 18 as a sensor used for gesture recognition. Specifically, in a state where the user is stationary, it is presumed that the uniform motion and the acceleration motion are detected in the motion sensor 18 by the action and the gesture of the user, and the direction change is not detected. Therefore, in a case where the user is stationary, the acceleration sensor is activated as a sensor used for the gesture recognition, and the gyro sensor is stopped. As a result, in Example 2, since the sensor not required for the gesture recognition is stopped according to the state of the user, the power consumption in the information processing apparatus 10 can be suppressed.

Furthermore, in a case where the user is walking/running, the setting change unit 266 sets the acceleration sensor and the gyro sensor among the various sensors of the motion sensor 18, as sensors used for the gesture recognition. In a case where the user is in a running state or the like, it is presumed that, due to the behavior and the gesture of the user, uniform motion (for example, uniform motion by the user's behavior), acceleration motion (for example, sudden acceleration motion due to the user's behavior), a change in direction (for example, a sudden change in direction due to user's behavior), vibration, or the like is detected in the motion sensor 18. Therefore, in a case where the user is walking/running, in order to detect these, the acceleration sensor and the gyro sensor are activated as sensors used for the gesture recognition.

Moreover, in a case where the user is on an automobile, the setting change unit 266 sets the acceleration sensor and the gyro sensor among the various sensors of the motion sensor 18, as sensors used for the gesture recognition. In a state in which the user is on an automobile, due to the movement of the automobile, the behavior and gesture of the user, in the motion sensor 18, the constant velocity motion (for example, the constant velocity motion due to the movement of the automobile), the acceleration motion (for example, gentle acceleration motion due to movement of the automobile), direction change (for example, change of direction due to turning of the automobile), and the like are detected. Therefore, in a case where the user is on an automobile, in order to detect these, the acceleration sensor and the gyro sensor are activated as sensors used for gesture recognition.

Furthermore, in a case where the user is on an airplane, the setting change unit 266 sets the acceleration sensor among the various sensors of the motion sensor 18 as a sensor used for gesture recognition. While the user is on an airplane, although the airplane moves, it can be presumed that the user is seated. Accordingly, due to the movement of the airplane and the behavior and gesture of the user, it is presumed that uniform motion (for example, high-speed uniform motion due to movement of the airplane), or acceleration motion (for example, gentle acceleration motion due to movement of the airplane) is detected, and a change in direction is not detected in the motion sensor 18. Therefore, in a case where the user is on an airplane, the acceleration sensor is activated as a sensor used for gesture recognition, and the gyro sensor is stopped. As a result, it is possible to suppress the power consumption in the information processing apparatus 10 as similar to description above.

Example 3

Next, referring to FIG. 13, Example 3 in which the type of the gesture to be recognized is changed according to the user's behavior will be described. FIG. 13 is an explanatory diagram for explaining Example 3 according to the present embodiment, and specifically shows an example of the type of gesture to be recognized according to the user's behavior.

Here, for example, it is assumed that the gesture recognition unit 262 can recognize three of the actions of the user, that is, swinging up the arm 80, swinging the arm 80 right and left, and rotating the arm 80, as predetermined gestures, as an initial setting. In Example 3, as shown in FIG. 13, the setting change unit 266 performs setting such that all or any of the above three gestures are recognized according to the user's behavior.

Specifically, in a case where the user is stationary such as waiting for a train, the user can perform various gestures. Therefore, in Example 3, in a case where the user is stationary, the setting change unit 266 performs setting such that all the gestures out of the above three are recognized. Furthermore, in a case where the user is walking, if the user performs various gestures, the user may be at risk depending on the gesture. For example, in a case where the user is walking on the platform or the like, when performing a gesture with a large hand gesture while walking, since two actions are performed at the same time, the attention of the user is dispersed and the user's arm 80 may contact with the train, or the user may fall off the home in some cases. Accordingly, considering performing a gesture while securing the safety of the walking user, there are limitations on the gesture that the user can perform. Therefore, in Example 3, in a case where the user is walking, the setting change unit 266 performs setting such that only the gesture of swinging up the arm 80 out of the above three is recognized. Moreover, in a case where the user is on a train, the user is presumed to be standing or seated in the train, so that the user can perform various gestures as similar to a case where the user is stationary. Therefore, in Example 3, in a case where the user is on a train, as similar to description above, the setting change unit 266 performs setting such that all the gestures out of the above three are recognized.

Incidentally, in general, as the number of types of gestures to be recognized decreases, the accuracy of recognition of each gesture improves. Accordingly, as in Example 3 described above, it is sufficient that the type of the gesture to be recognized is changed according to the user's behavior so that only the gesture according to the user's behavior is recognized, and the number of types of gestures is limited. As a result, according to Example 3, the gesture recognition accuracy can be improved.

Example 4

Next, referring to FIG. 14, Example 4 in which the recognition engine is changed according to the user's behavior will be described. FIG. 14 is an explanatory diagram for explaining Example 4 according to the present embodiment, and specifically shows an example of a recognition engine according to the user's behavior. As described above, the recognition engine means a mechanism and a program (including various settings) for executing information processing for recognizing a gesture of the user.

In Example 4, as shown in FIG. 14, the recognition engine used for the gesture recognition is changed according to the user's behavior. For example, in a case where the user is stationary, the setting change unit 266 controls the gesture recognition unit 262 or the like so as to use the user stationary mode recognition engine. In the user stationary mode recognition engine, for example, only the acceleration sensor is set as the sensor used for the gesture recognition, and the threshold value thereof is set low. Moreover, in the user stationary mode recognition engine, three gestures, that is, the gesture of swinging up the arm 80, the gesture of swinging the arm 80 right and left, and the gesture of rotating the arm 80 as the types of gestures to be recognized.

Furthermore, examples of another recognition engine include, as shown in FIG. 12, "train mode recognition engine" used in a case where a user is on a train, "user walking mode recognition engine" used in a case where a user is walking. As shown in FIG. 12, examples of still another recognition engine include an "automobile mode recognition engine" used in a case where a user is on an automobile, for example. In other words, in Example 4, by using a dedicated recognition engine according to the user's behavior, parameters related to various recognition settings can be changed at the same time, and the accuracy of the gesture recognition can be improved.

Furthermore, the sensing tendency of the motion sensor 18 changes also depending on the vehicle on which the user is riding for movement. For example, even in a case where the user is on an automobile, the sensing tendency of the motion sensor 18 varies depending on the difference in motion of the automobile between the case of traveling on a general road and the case of traveling on a highway. Furthermore, also with regard to airplanes, high-speed trains, or the like, the sensing tendency of the motion sensor 18 varies depending on the speed and the like. Accordingly, in the present embodiment, in order to further improve the recognition accuracy of the gesture, according to the type, speed, and the like of the vehicle, it is preferable that the recognition setting specialized for them (for example, preparing a dedicated recognition engine) be performed.

5.2 Example of Context Related to User

In Examples 1 to 4 described so far, the context related to the user is explained as being the user's behavior, but in the present embodiment, the context related to the user is not limited to the user's behavior. Therefore, another example of the context related to the user will be described below.

Example 5

First, referring to FIGS. 15 and 16, Example 5 in which the state of the arm 80 of the user wearing the information processing apparatus 10 is used as a context related to the user will be described. FIGS. 15 and 16 are explanatory diagrams for explaining Example 5 according to the present embodiment. Specifically, FIG. 15 shows an example of the state of the user's arm 80, and FIG. 16 shows an example of the threshold of the recognition algorithm according to the state of the user's arm 80.

As described above, the tendency of sensing of the motion sensor 18 changes according to the worn state or position of the motion sensor 18 to the user. As a result, even in a case where the user performs the same gesture action, the obtained sensing results may be different. Hereinafter, a case where the arm 80 shown on the left side of FIG. 15 is lowered and a case where the arm 80 shown on the right side of FIG. 15 is raised will be described as an example. In such a case, since the position of the information processing apparatus 10 including the motion sensor 18 varies according to the state of the arm 80, even if the user performs the action of swinging the arm 80 right and left in the same manner, the sensing tendency of the motion sensor 18 may change and the sensing result may be different. Therefore, in Example 5, for example, as shown in FIG. 16, the setting of the threshold of the recognition algorithm is changed between a case where the arm 80 is lowered and a case where the arm 80 is raised. More specifically, as shown in FIG. 16, in a case where the arm 80 is lowered, the threshold value is set to 3, and in a case where the arm 80 is raised, the threshold value is set to 6. Note that, as described above, the threshold refers to a condition that serves as a boundary when determining whether the sensing result is caused by the gesture A or the gesture B with respect to a sensing result. As described above, by changing the threshold, even in a case where different sensing results are obtained, since the boundary of determination changes, the gesture recognition unit 262 can recognize that the gesture is the same.

Furthermore, in general, the trend of right arm movement and the trend of left arm movement are different. Accordingly, even in a case where the user performs the same gesture, the sensing result by the motion sensor 18 may be different depending on whether it is caused by the right arm or by the left arm. Therefore, in the present embodiment, whether the arm 80 on which the motion sensor 18 is worn is a right arm or a left arm may be recognized, and the recognition setting may be changed according to the arm 80. As a result, the gesture recognition unit 262 can recognize that both the gesture by the right arm and the gesture by the left arm are the same gesture if they are the same type of gesture.

Furthermore, in the present embodiment, the context related to the user is not limited to one type, and two kinds of contexts may be combined. Examples 6 to 8 in which recognition setting is performed according to a combination of two kinds of contexts will be described below.

Example 6

First, referring to FIG. 17, Example 6 in which the recognition setting is performed according to the combination of the action of the user and the user's pulse rate will be described. FIG. 17 is an explanatory diagram for explaining Example 6 according to the present embodiment, and specifically shows an example of a threshold of a sensor according to the combination of the user's behavior and the user's pulse rate. In Example 6 described below, since the tendency of the gesture of the user changes according to the mental state of the user, or the like, the recognition setting is changed so that the gesture recognition according to this change can be made.

Here, it is assumed that the excited state of the user can be considered to have a correlation with the user's pulse rate. Furthermore, it is assumed that the tendency of the gesture of the user also has a correlation with the excited state of the user, and it is assumed that, for example, even in a case of the same gesture, in a state where the degree of excitation is low, the user performs small hand gesture action (for example, motion with small swinging width of the hand), and in a state where the degree of excitation is high, the user performs large hand gesture action (for example, motion with a large swinging width of the hand). Furthermore, it is assumed that the tendency of the gesture of the user changes also according to the user's action, and even with the same gesture, the user performs a small hand gesture when the user is stationary, and the user performs a large hand gesture action when the user is running.

As shown in FIG. 17, in a case where the pulse rate is 80 or less, it is assumed that the degree of excitation of the user is low. In such a situation, in a case where the user is walking or on a train, it is assumed that the user performs a small hand gesture action. Therefore, in Example 6, the threshold of the sensor is set low (in FIG. 17, the threshold is set to 1 or 2) so that even in a case where the user performs small hand gesture action, gesture is recognized. Furthermore, in a case where the pulse rate is 81 or more, it is assumed that the degree of excitation of the user is high. In such a situation, in a case where the user is walking or on a train, it is assumed that the user performs a large hand gesture action. Therefore, in Example 6, the threshold of the sensor is set high (in FIG. 17, the threshold is set to 3) so that even in a case where the user performs large hand gesture action, gesture is recognized. Note that whatever the state of the pulse rate is, in a case where the user is running, it is assumed that the user performs a large hand gesture action. Therefore, in Example 6, in a case where the user is running, even if the pulse rate changes, the sensor threshold is not changed (in FIG. 17, this threshold is set to 4).

Example 7

Next, referring to FIG. 18, Example 7 in which the recognition setting is performed according to the combination of the user's behavior and the user's age will be described. FIG. 18 is an explanatory diagram for explaining Example 7 according to the present embodiment, and specifically shows an example of a threshold of a sensor according to the combination of the user's behavior and the user's age.

The tendency of the gesture of the user changes according to the user's attributes, for example, age, sex, and the like. For example, even with the same gesture, it is assumed that, if the user is a young person, there is a tendency that the user performs large hand gesture action, and if the user is an elderly person, there is a tendency that the user performs small hand gesture action. Therefore, in Example 7, the threshold of the sensor is changed in consideration of the age of the user to further improve the recognition accuracy of the gesture.

Specifically, as shown in FIG. 18, in a case of a user of 30 years old or younger, since it is assumed that a large hand gesture action is performed, the threshold of the sensor is set high. Moreover, the setting is changed also according to the user's behavior, and since it is assumed that large hand gesture action is performed when the user is running as compared with a case where the user is walking or on a train, the threshold of the sensor is set to relatively high. Furthermore, in a case of users of 31 years old or older to 60 years old or younger, it is assumed that hand gesture is smaller than those of the user of 30 years old or younger. Therefore, the threshold of the sensor is set to lower than that for the user of 30 years or younger. Moreover, in a case of a user of 61 years old or older, since the hand gesture is assumed to be further reduced, the threshold of the sensor is set to be lower than that of the user of 31 years old or more to 60 years old or younger. Note that in a case of the user of 61 years old or older, it may be dangerous to operate the information processing apparatus 10 by gesture while the user is running. Therefore, in Example 7, in a case where the user of 60 years old or older is running, the threshold of the sensor is set to the maximum (in FIG. 18, the threshold is set to 10), so that the motion sensor 18 does not detect the gesture.

Note that, in the present embodiment, the context related to the user is determined using the age as attribute information of the user, but the present invention is not limited to this. In the present embodiment, for example, the user's behavior or situation (during sports, commuting, or the like) may be recognized using the user's behavior schedule and the recognition setting may be changed accordingly.

Example 8

Next, referring to FIG. 19, Example 8 in which the recognition setting is performed according to the combination of the user's behavior and the type of the used application of the external device connected to the information processing apparatus 10 will be described. FIG. 19 is an explanatory diagram for explaining Example 8 according to the present embodiment, and specifically shows an example of the number of types of the gestures to be recognized according to the combination of the user's behavior and the type of application used by the external device.

By recognizing the state of the external device used by the user, it is possible to presume the command desired by the user to perform the input operation by the gesture. Specifically, in a case where the user is playing a game on the smartphone 40, it can be presumed that the user desires various input operations related to the game operation. Furthermore, in a case where the user is on a call on the smartphone 40, it can be presumed that the user desires only the input operation for terminating the call. In this way, the number of commands desired by the user changes according to the state of the user's smartphone 40, and the type of the gesture to be recognized by the information processing apparatus 10 also changes.

Moreover, the number of commands desired by the user changes also according to the user's behavior. When the user is stationary, since the user can perform various operations, the number of desired commands increases. On the other hand, when the user is running, since the actions that can be performed are limited as compared with walking, the number of desired commands is reduced. Moreover, since the user's attention is dispersed during the operation such as running, it is not preferable for user's safety to execute many commands. Therefore, in Example 8, since the number of commands desired by the user changes according to the user's behavior, the type of the gestures to be recognized by the information processing apparatus 10 is changed.

More specifically, as shown in FIG. 19, in a case where the user has activated the navigation application on the smartphone 40, the number of gestures to be recognized is set as follows. When the user is walking, since walking is presumed while being guided by the navigation application, setting is performed such that two gestures related to the scroll of the navigation screen and the command of enlargement. Furthermore, while the user is running, although the navigation application is activated, it is presumed that the user does not actually see the application, so that setting is performed such that one gesture related to the stop command of the navigation application is recognized. Moreover, in a case where the user is on a train, since it is expected that various searches is performed with a navigation application, setting is performed such that four gestures related to commands, that is, scrolling of the screen of the navigation, enlarging, reducing, and new search.

Furthermore, in a case where the user activates the call application on the smartphone 40, the number of gestures to be recognized is set as follows. When the user is walking or running, walking/traveling while phone call is presumed, so that setting is performed such that one gesture related to the command of stopping the call is recognized. Furthermore, in a case where the user is on a train, it is presumed that, after answering the call, the user temporarily cancels the call according to the surrounding situation, so that setting is performed such that two gestures related to stop or hold of the call are recognized.

Moreover, in a case where the user activates the game application on the smartphone 40, the number of gestures to be recognized is set as follows. When the user is walking, since it is expected that the user will start the game from now, setting is performed such that one gesture related to the game start command is recognized. Furthermore, when the user is running, it is dangerous for the user to play the game while running, so that setting is performed such that the command is not generated, in other words, the gesture is not recognized (set to 0 in FIG. 19). Moreover, in a case where the user is on a train, since it is expected that the user plays a game, setting is performed such that four gestures related to commands such as game start, operation, or the like.

Note that, in a public space considered to have a population density higher than a predetermined population, such as in a train, setting is performed such that large actions such as swinging up an arm and swinging an arm are not recognized, and the gestures to be recognized may be changed such that only action of rotating the arm and various finger gestures are recognized. In other words, setting may be performed such that it is decided whether or not it is a public space, and the gesture having a relatively large action amount is limited or prohibited in a public space. Furthermore, in consideration of the possibility of the user hitting the hands around, setting may be performed such that the gesture having relatively large action amount is limited or prohibit in a relatively narrow space such as in an automobile as described later. Such Limitation or prohibition of gesture recognition based on the possibility that the user hits his/her hand around may be arbitrarily released by the user. On the other hand, release of limitation or prohibition based on the "driving state" of an automobile driven by the user, which will be described later, by the user may be prohibited based on the laws and rules of each country.

In this way, it is sufficient that the type of the gesture to be recognized is changed according to the combination of the state of the external device and the user's behavior so that only the gesture according to the user's behavior is recognized, and the number of types of gestures is limited. As a result, according to Example 8, the accuracy of the gesture recognition can be improved. Furthermore, by limiting the number of types of gestures to be recognized in this way, commands that can be executed by the information processing apparatus 10 are limited, so that it is also possible to avoid dangers caused by dispersion of the user's attention due to use of the information processing apparatus 10 or an external device.

Note that the external device may be an automobile, and may limit the type of gesture to be recognized according to the running state of the automobile, and limit the commands that can be executed by the information processing apparatus 10. In such a case, since the executable commands are limited according to the running state of the automobile driven by the user, it is possible to avoid the danger caused by the user operating the information processing apparatus 10 or the like while driving an automobile.

Note that, in Examples 6 to 8 described above, the recognition setting is changed according to the combination of two types of contexts (user's pulse rate and user's behavior, user's age and user's behavior, or used application and user's behavior). However, in the present embodiment, it is not limited to the combination of two types of contexts, and the recognition setting may be changed according to a combination of three or more types of contexts.

5.3 Example of Command Change

Example 9

Figures 20, 21:
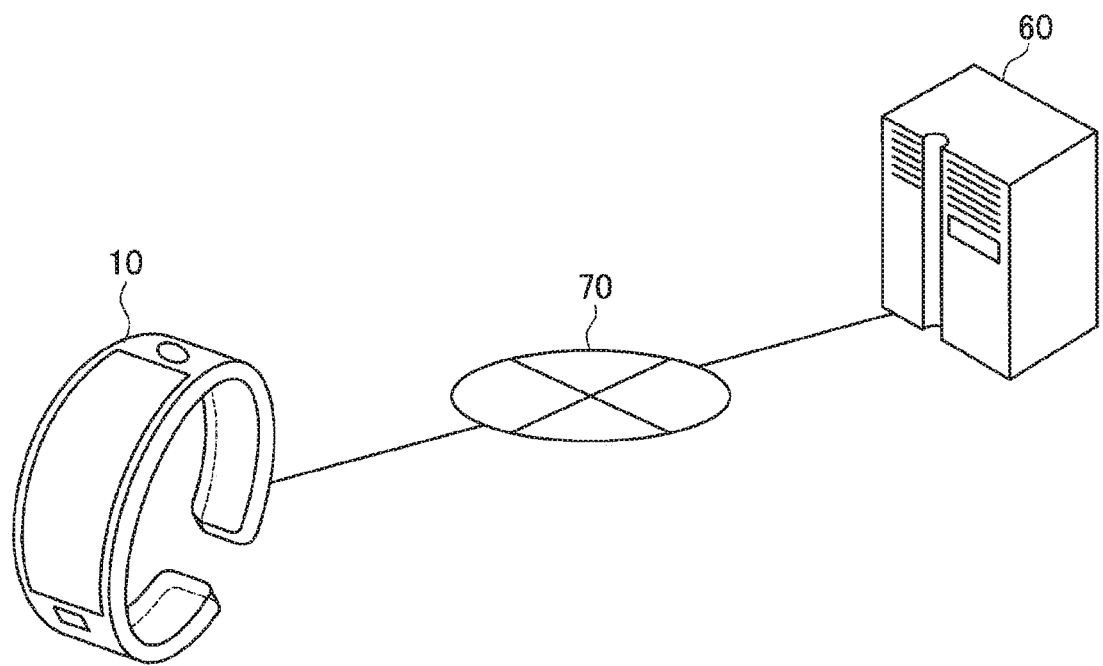
FIG. 20 is an explanatory diagram explaining Example 9 according to the same embodiment.
FIG. 21 is an explanatory diagram explaining a modified example of the information processing apparatus 10 according to an embodiment of the present disclosure.

In the present embodiment, the command corresponding to the gesture may be changed according to the context related to the user. Example 9 in which the command corresponding to the gesture is changed according to the context will be described below with reference to FIG. 20. FIG. 20 is an explanatory diagram explaining Example 9 according to the present embodiment, and shows commands corresponding to the type of the external device connected to the information processing apparatus 10.

For example, in Example 9, as shown in FIG. 20, in a case where the external device connected to the information processing apparatus 10 is the headset 50, it is highly probable that the user desires a command related to music reproduction. Accordingly, in such a case, the device control unit 264 associates the command "next music (fast forward)" with the gesture A, and the command "previous music" with the gesture B. On the other hand, in a case where the external device connected to the information processing apparatus 10 is the smartphone 40, it is highly probable that the user desires to operate the smartphone screen. Therefore, in such a case, the device control unit 264 associates a command "scroll (of screen)" with the gesture A, and a command "cancel (of screen display)" with the gesture B. In other words, in Example 9, the command to be issued is changed according to the situation of the user even with the same gesture. As a result, it is possible to easily issue a command intended by the user, so that the convenience of the information processing apparatus 10 can be increased. Furthermore, since commands corresponding to gestures are changed according to the context related to the user, a plurality of commands is associated with the same gesture, so that an increase in the number of gestures to be recognized can be suppressed. Accordingly, since the number of gestures to be recognized is limited, further improvement in gesture recognition accuracy can be expected.

Furthermore, in Example 9, for example, in a case where the external device connected to the information processing apparatus 10 is the smartphone 40 and the headset 50, the command corresponding to the gesture is changed according to the activation state of the external device. For example, in a case where the smartphone 40 is in a sleep state and the headset 50 is operating, it is determined that the gesture of the user is intended for operation on the headset 50, and a command is issued.

Note that the Examples 1 to 9 described above can be combined as appropriate, and by combining them, it is possible to further improve the gesture recognition accuracy.

6. Conclusion

As described above, according to the embodiment of the present disclosure, it is possible to further improve the gesture recognition accuracy by changing the recognition setting in recognition of the gesture of the user according to the context related to the user. As a result, according to the present embodiment, since gesture recognition accuracy improves, it is possible to issue a command desired by the user on the basis of the recognized gesture, so that it is possible to prevent a malfunction in the information processing apparatus 10. Furthermore, in the present embodiment, since the information processing apparatus 10 automatically recognizes the context related to the user, it is possible to save the trouble of the user inputting the context.

Note that the information processing apparatus 10 according to the present embodiment is not limited to the wristband type terminal described above, but may be a mobile terminal (including a motion controller terminal) carried by a user, a wearable terminal worn on the user's body, or an implant terminal inserted into the user's body. Furthermore, examples of wearable terminals include HMD, an ear device, an anklet, a bracelet, a collar, a pad, shoes, clothes, a batch, and the like.

Furthermore, the information processing apparatus 10 according to the present embodiment may not be a device that performs information processing in a stand-alone manner as described above. For example, the information processing apparatus 10 according to the present embodiment may be applied to a system including a plurality of apparatuses on the premise of connection to the network 70 (or communication between apparatuses) such as cloud computing, for example. In other words, the information processing apparatus 10 according to the present embodiment described above can also be realized as an information processing system that performs processing according to the information processing method according to the present embodiment by a plurality of apparatuses, for example. More specifically, as shown in FIG. 21, which is an explanatory diagram explaining a modification of the information processing apparatus 10 according to an embodiment of the present disclosure, the information processing apparatus 10 according to the present embodiment may be an apparatus connected via the server 60 and the network 70. In this case, a partial function of the main control unit 26 of the information processing apparatus 10 is implemented by the server 60. For example, context recognition such as a user's behavior may be performed by the server 60, and the recognition of the gesture of the user may be performed by the information processing apparatus 10.

7. Hardware Configuration

Figure 22:
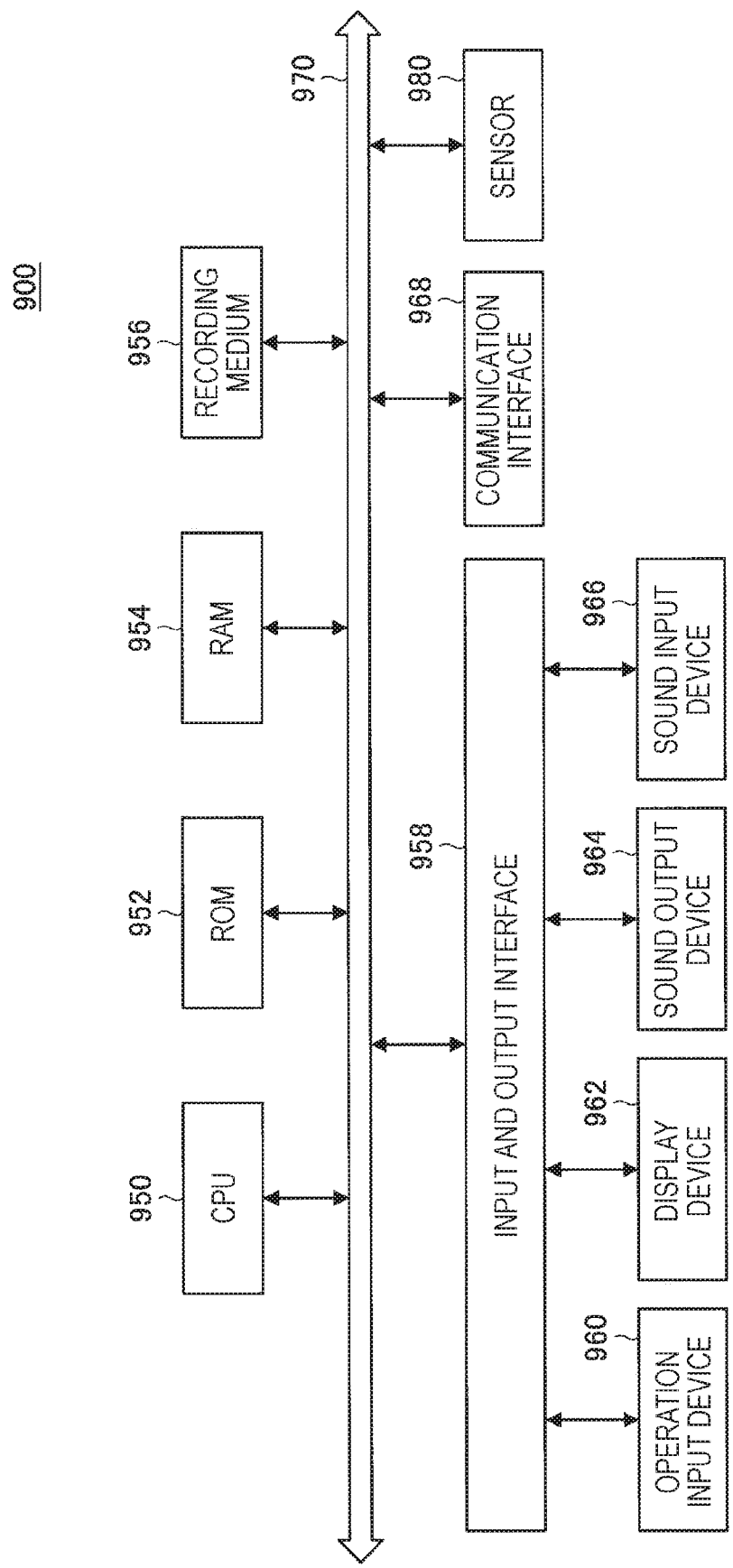
FIG. 22 is a block diagram showing an example of a hardware configuration of the information processing apparatus 10 according to an embodiment of the present disclosure.

FIG. 22 is an explanatory diagram showing an example of a hardware configuration of an information processing apparatus 900 according to the present embodiment. In FIG. 22, the information processing apparatus 900 shows an example of the hardware configuration of the information processing apparatus 10 described above.

The information processing apparatus 900 has, for example, a CPU 950, a ROM 952, a RAM 954, a recording medium 956, an input and output interface 958, and an operation input device 960. Moreover, the information processing apparatus 900 has a display device 962, a sound output device 964, a sound input device 966, a communication interface 968, and a sensor 980. Furthermore, the information processing apparatus 900 connects the respective constituent elements by, for example, a bus 970 as a data transmission path.

(CPU 950)

The CPU 950 includes, for example, one or more processors including an operation circuit such as a CPU, various processing circuits, or the like and functions as a control unit (for example, a main control unit 26 described above) that controls the entire information processing apparatus 900. Furthermore, for example, in the information processing apparatus 900, the CPU 950 functions as the context recognition unit 260, the gesture recognition unit 262, the device control unit 264, the setting change unit 266, or the like.

(ROM 952 and RAM 954)

The ROM 952 stores programs used by the CPU 950, control data such as operation parameters, or the like. The RAM 954 temporarily stores, for example, programs executed by the CPU 950, or the like.

(Recording Medium 956) The recording medium 956 functions as the storage unit 24 described above, and stores, for example, various pieces of data such as data related to the information processing method according to the present embodiment, or various applications. Here, examples of the recording medium 956 include a magnetic recording medium such as a hard disk, and a nonvolatile memory such as a flash memory. Furthermore, the recording medium 956 may be detachable from the information processing apparatus 900.

(Input and Output Interface 958, Operation Input Device 960, Display Device 962, Audio output Device 964, and Audio Input Device 966)

The input and output interface 958 connects, for example, the operation input device 960, the display device 962, or the like. Examples of the input and output interface 958 include a universal serial bus (USB) terminal, a digital visual interface (DVI) terminal, a high-definition multimedia interface (HDMI) (registered trademark) terminal, various processing circuits, and the like.

For example, the operation input device 960 functions as an operation unit of the touch panel display 12 described above, is provided in the information processing apparatus 900, and is connected to the input and output interface 958 inside the information processing apparatus 900. Examples of the operation input device 960 include buttons, direction keys, a rotary selector such as a jog dial, a touch panel, combinations thereof, or the like.

For example, the display device 962 functions as a display unit of the touch panel display 12 described above, is provided in the information processing apparatus 900, and is connected to the input and output interface 958 inside the information processing apparatus 900. Examples of the display device 962 include a liquid crystal display, an organic EL display (organic electro-luminescence display), and the like.

For example, the sound output device 964 functions as the speaker 14 described above, is provided on the information processing apparatus 900, for example, and is connected to the input and output interface 958 inside the information processing apparatus 900. For example, the sound input device 966 functions as the microphone 16 described above, is provided on the information processing apparatus 900, for example, and is connected to the input and output interface 958 inside the information processing apparatus 900.

Note that it is of course possible to connect that the input and output interface 958 with an external device such as an operation input device (for example, a keyboard, a mouse, or the like) external to the information processing apparatus 900, or an external display device.

(Communication Interface 968)

The communication interface 968 functions as, for example, the communication unit 22 described above, and functions as a communication unit for performing wireless or wired communication with an external device such as the server 60 via a network (or directly). Here, examples of the communication interface 968 include a communication antenna and a radio frequency (RF) circuit (wireless communication), an IEEE 802.15.1 port and a transmission and reception circuit (wireless communication), an IEEE 802.11 port and a transmission and reception circuit (wireless communication), a local area network (LAN) terminal and a transmission and reception circuit (wired communication), or the like.

(Sensor 980)

The sensor 980 functions as the motion sensor 18 and the biological sensor 20 described above. Moreover, the sensor 980 may include various sensors such as a positioning sensor and a temperature sensor.

An example of the hardware configuration of the information processing apparatus 900 has been described above. Note that the hardware configuration of the information processing apparatus 900 is not limited to the configuration shown in FIG. 22. Each component described above may be configured using general-purpose members, or may be configured with hardware specialized for the function of each component. Such a configuration can be appropriately changed according to the technical level at the time of implementation.

For example, the information processing apparatus 900 may not include the communication interface 968 in a case where the communication is performed with an external device or the like via a connected external communication device, or in a case of a configuration in which processing is performed in a standalone manner. Furthermore, the communication interface 968 may have a configuration capable of communicating with one or two or more external devices by a plurality of communication methods.

8. Supplementary Information

Note that the embodiment of the present disclosure described above may include, for example, a program for causing a computer to function as the information processing apparatus 10 according to the present embodiment, and a non-transitory tangible medium on which the program is recorded. Furthermore, the program may be distributed via a communication line (including wireless communication) such as the Internet.

Furthermore, each step in the information processing according to the embodiment described above does not necessarily have to be processed in the described order. For example, each step may be processed in a changed order as appropriate. Furthermore, instead of being processed in chronological order, each step may be processed partly in parallel or separately. Moreover, the processing method of each step does not necessarily have to be processed according to the described method, and for example, may be processed by other methods by other functional units.

While preferred embodiment of the present disclosure has been described in detail with reference to the accompanying drawings, the technical scope of the present disclosure is not limited to such examples. It is obvious that various variations and modifications can be conceived within the scope of the technical idea described in the claims by a person having ordinary knowledge in the field of technology to which the present disclosure belongs, and, of course, it is understood that these variations and modifications belong to the technical scope of present disclosure.

Furthermore, the effects described in this specification are merely descriptive or exemplary, and are not limitative. That is, the technique according to the present disclosure can exhibit other effects obvious to those skilled in the art from the description of the present specification together with the effects described above or instead of the effects described above.

Note that the following configurations are also within the technical scope of the present disclosure.

(1)

An information processing apparatus including: a context recognition unit that recognizes a context related to a user; a gesture recognition unit that recognizes a gesture of the user; and a setting change unit that changes a recognition setting of the gesture recognition unit on the basis of a recognition result of the context recognition unit.

(2)

The information processing apparatus according to (1) described above, in which the gesture recognition unit recognizes the gesture of the user on the basis of one or a plurality of sensing results by a motion sensor that detects a movement of the user.

(3)

The information processing apparatus according to (2) described above, in which the motion sensor includes at least one of an acceleration sensor worn on the user, a gyro sensor worn on the user, and an imaging device that captures an image of the user.

(4)

The information processing apparatus according to (2) or (3) described above, in which the setting change unit changes a detection setting of the motion sensor as a change of the recognition setting.

(5)

The information processing apparatus according to (4) described above, in which the context recognition unit recognizes the context related to the user on the basis of one or a plurality of the sensing results by the motion sensor.

(6)

The information processing apparatus according to (5) described above, in which the context recognition unit recognizes the context related to the user on the basis of one or a plurality of the sensing results by the motion sensor in which the detection setting is changed by the setting change unit.

(7)

The information processing apparatus according to any one of (2) to (6) described above, in which the setting change unit changes the recognition setting on the basis of at least one of a worn state and a position of the motion sensor.

(8)

The information processing apparatus according to any one of (2) to (6) described above, in which the setting change unit changes a type of the sensing result acquired by the gesture recognition unit.

(9)

The information processing apparatus according to any one of (2) to (6) described above, in which the setting change unit changes a weighting for each of the plurality of sensing results acquired by the gesture recognition unit.

(10)

The information processing apparatus according to any one of (1) to (6) described above, in which the setting change unit changes a recognition algorithm used by the gesture recognition unit.

(11)

The information processing apparatus according to any one of (1) to (6) described above, in which the setting change unit changes a recognition engine used by the gesture recognition unit.

(12)

The information processing apparatus according to any one of (1) to (6) described above, in which the setting change unit changes a type of a gesture to be recognized by the gesture recognition unit.

(13)

The information processing apparatus according to any one of (1) to (12) described above, in which the context recognition unit recognizes the context related to the user on the basis of a state of a user terminal used by the user.

(14)

The information processing apparatus according to (13) described above, in which the context recognition unit recognizes the context related to the user on the basis of a type of the user terminal, a type of the application activated in the user terminal, or a type of a device connected to the user terminal.

(15)

The information processing apparatus according to any one of (1) to (12) described above, in which the context recognition unit recognizes the context related to the user on the basis of biological information acquired from the user.

(16)

The information processing apparatus according to any one of (1) to (12) described above, in which the setting change unit changes the recognition setting on the basis of attribute information and a behavior schedule of the user.

(17)

The information processing apparatus according to any one of (1) to (16) described above, further including a command issuing unit that issues a command for information processing on the basis of the gesture recognized by the gesture recognition unit.

(18)

The information processing apparatus according to any one of (1) to (17) described above, in which the information processing apparatus is any of a mobile terminal carried by the user, a wearable terminal worn on the body of the user, or an implant terminal inserted into the body of the user.

(19)

An information processing method including: recognizing a context related to a user; recognizing a gesture of the user; and changing a recognition setting in recognition of the gesture on the basis of a recognition result of the context related to the user.

(20)

A program for causing a computer to function as: a context recognition unit that recognizes a context related to a user; a gesture recognition unit that recognizes a gesture of the user; and a setting change unit that changes a recognition setting of the gesture recognition unit on the basis of a recognition result of the context recognition unit.

REFERENCE SIGNS LIST

10, 900 Information processing apparatus
12 Touch panel display
14 Speaker
16 Microphone
18 Motion sensor
20 Biological sensor
22 Communication unit
24 Storage unit
26 Main control unit
40 Smartphone
50 Headset
60 Server 70 Network
80 Arm
82, 84 Finger
260 Context recognition unit
262 Gesture recognition unit
264 Device control unit
266 Setting change unit
950 CPU
952 ROM
954 RAM
956 Recoding medium
958 Input and output interface
960 Operation input device
962 Display device
964 Audio output device
966 Audio input device
968 Communication interface
970 Bus
980 Sensor

The invention claimed is:

1. An information processing apparatus, comprising:
   a plurality of first sensors including:
      a pressure sensor configured to detect a pressure applied by the information processing apparatus on a wrist of a user; and
      a motion sensor configured to detect a movement of the user; and
   a processor configured to:
      recognize one of a first worn state or a second worn state of the information processing apparatus based on the detection of the pressure applied by the information processing apparatus on the wrist of the user, wherein
         the one of the first worn state or the second worn state is recognized as a context related to the user,
         the first worn state indicates an application of a first pressure by the information processing apparatus on the wrist of the user,
         the second worn state indicates an application of a second pressure by the information processing apparatus on the wrist of the user, and
         the first pressure is different from the second pressure;
      change a detection setting of the motion sensor for recognition of a gesture of the user, wherein the change in the detection setting of the motion sensor is based on the recognition of the one of the first worn state or the second worn state of the information processing apparatus on the wrist of the user; and
      recognize the gesture of the user based on the change in the detection setting of the motion sensor.

2. The information processing apparatus according to claim 1, wherein
   the processor is further configured to acquire a plurality of sensing results from the plurality of first sensors, and
   the processor is further configured to recognize the gesture of the user based on at least one sensing result of the plurality of sensing results by the motion sensor.

3. The information processing apparatus according to claim 2, wherein the motion sensor includes at least one of an acceleration sensor worn on the user, a gyro sensor worn on the user, or an imaging device configured to capture an image of the user.

4. The information processing apparatus according to claim 2, wherein the processor is further configured to recognize the context related to the user based on the at least one sensing result of the plurality of sensing results by the motion sensor.

5. The information processing apparatus according to claim 4, wherein the processor is further configured to recognize the context related to the user based on the at least one sensing result by the motion sensor in which the detection setting is changed.

6. The information processing apparatus according to claim 2, wherein the processor is further configured to change a type of the at least one sensing result of the plurality of sensing results.

7. The information processing apparatus according to claim 2, wherein the processor is further configured to change a weightage for each of the plurality of sensing results.

8. The information processing apparatus according to claim 1, wherein
   the processor is further configured to change parameters related to a plurality of recognition settings for the recognition of the gesture, and
   the parameters related to the plurality of recognition settings are changed based on whether the motion sensor is on one of a right hand or a left hand of the user.

9. The information processing apparatus according to claim 8, wherein the change in the parameters related to the plurality of recognition settings includes a change in a type of a sensor of the plurality of first sensors used for the recognition of the gesture, a threshold value for the recognition of the gesture by the sensor, and types of gestures to be recognized.

10. The information processing apparatus according to claim 1, wherein the processor is further configured to:
   recognize the gesture of the user based on a recognition algorithm of a plurality of recognition algorithms; and
   change the detection setting in the recognition algorithm, at a time of the recognition of the gesture, based on the context of the user.

11. The information processing apparatus according to claim 1, wherein the processor is further configured to change a type of the gesture to be recognized based on a behavior of the user.

12. The information processing apparatus according to claim 1, wherein the processor is further configured to recognize the context related to the user based on a state of a user terminal of the user.

13. The information processing apparatus according to claim 12, wherein the processor is further configured to recognize the context related to the user based on at least one of a type of the user terminal, a type of an application activated in the user terminal, or a type of a device connected to the user terminal.

14. The information processing apparatus according to claim 1, wherein
   the plurality of first sensors further includes a biological sensor, and
   the processor is further configured to:
      acquire biological information of the user from the biological sensor; and
      recognize the context related to the user based on the biological information.

15. The information processing apparatus according to claim 1, wherein the processor is further configured to change parameters related to a plurality of recognition settings based on attribute information and a behavior schedule of the user, and the parameters related to the plurality of recognition settings are for the recognition of the gesture of the user.

16. The information processing apparatus according to claim 15, wherein the processor is further configured to:
acquire the attribute information including an age of the user; and
change the parameters related to the plurality of recognition settings based on the age of the user.

17. The information processing apparatus according to claim 1, wherein the processor is further configured to issue a command to process information based on the recognized gesture.

18. The information processing apparatus according to claim 1, wherein the information processing apparatus is one of a mobile terminal carried by the user, a wearable terminal worn on a body of the user, or an implant terminal inserted into the body of the user.

19. The information processing apparatus according to claim 1, wherein
the motion sensor includes a plurality of second sensors, and
the change in the detection setting of the motion sensor includes a change in a threshold of each sensor of the plurality of second sensors of the motion sensor.

20. The information processing apparatus according to claim 1, wherein
the processor is further configured to change a recognition engine among a plurality of recognition engines for the recognition of the gesture, and
the change in the recognition engine among the plurality of recognition engines includes a concurrent change in parameters related to a plurality of recognition settings for the recognition of the gesture.

21. An information processing method, comprising:
in an information processing apparatus comprising a processor, a pressure sensor configured to detect a pressure applied by the information processing apparatus on a wrist of a user, and a motion sensor configured to detect a movement of the user:
recognizing one of a first worn state or a second worn state of the information processing apparatus based on the detection of the pressure applied by the information processing apparatus on the wrist of the user, wherein
the one of the first worn state or the second worn state is recognized as a context related to the user,
the first worn state indicates an application of a first pressure by the information processing apparatus on the wrist of the user,
the second worn state indicates an application of a second pressure by the information processing apparatus on the wrist of the user, and
the first pressure is different from the second pressure;
changing a detection setting of the motion sensor for recognition of a gesture of the user, wherein the change in the detection setting of the motion sensor is based on the recognition of the one of the first worn state or the second worn state of the information processing apparatus on the wrist of the user; and
recognizing the gesture of the user based on the change in the detection setting of the motion sensor.

22. A non-transitory computer-readable medium having stored thereon, computer-executable instructions which, when executed by a processor, cause the processor to execute operations, the operations comprising:
in an information processing apparatus comprising the processor, a pressure sensor configured to detect a pressure applied by the information processing apparatus on a wrist of a user, and a motion sensor configured to detect a movement of the user:
recognizing one of a first worn state or a second worn state of the information processing apparatus based on the detection of the pressure applied by the information processing apparatus on the wrist of the user, wherein
the one of the first worn state or the second worn state is recognized as a context related to the user,
the first worn state indicates an application of a first pressure by the information processing apparatus on the wrist of the user,
the second worn state indicates an application of a second pressure by the information processing apparatus on the wrist of the user, and
the first pressure is different from the second pressure;
changing a detection setting of the motion sensor for recognition of a gesture of the user, wherein the change in the detection setting of the motion sensor is based on the recognition of the one of the first worn state or the second worn state of the information processing apparatus on the wrist of the user; and
recognizing the gesture of the user based on the change in the detection setting of the motion sensor.

* * * * *